United States Patent
Latham et al.

(10) Patent No.: US 12,143,239 B2
(45) Date of Patent: Nov. 12, 2024

(54) CONTROL OF VEHICLE-CARRIED WARNING SYSTEM THROUGH CONTROLLER AREA NETWORK (CAN) COMMUNICATIONS OF GLOBAL VARIABLES PROCESSED AS OPERANDS OF BEHAVIORAL EQUATIONS

(71) Applicant: ELECTRONIC CONTROLS COMPANY, Boise, ID (US)

(72) Inventors: Mark W. Latham, Boise, ID (US); Eric Wilson, Boise, ID (US); Dustin Christopherson, Star, ID (US)

(73) Assignee: Electronic Controls Company, Boise, ID (US)

( * ) Notice: Subject to any disclaimer, the term of this patent is extended or adjusted under 35 U.S.C. 154(b) by 878 days.

(21) Appl. No.: 17/259,902

(22) PCT Filed: Feb. 28, 2019

(86) PCT No.: PCT/US2019/020132
§ 371 (c)(1),
(2) Date: Jan. 12, 2021

(87) PCT Pub. No.: WO2020/018151
PCT Pub. Date: Jan. 23, 2020

(65) Prior Publication Data
US 2021/0203526 A1    Jul. 1, 2021

Related U.S. Application Data

(60) Provisional application No. 62/700,724, filed on Jul. 19, 2018.

(51) Int. Cl.
*H04L 41/0681* (2022.01)
*B60W 40/09* (2012.01)
(Continued)

(52) U.S. Cl.
CPC ............. *H04L 12/40* (2013.01); *B60W 40/09* (2013.01); *B60W 50/10* (2013.01); *B60W 50/14* (2013.01);
(Continued)

(58) Field of Classification Search
CPC ........... H04L 12/40; H04L 2012/40215; H04L 2012/40273; H04L 41/0681; H04L 41/065;
(Continued)

(56) References Cited

U.S. PATENT DOCUMENTS 6,208,955 B1 *   3/2001   Provan ................ G06F 11/2257
                                                           709/201
9,875,078 B1 *   1/2018   Daly ....................... G06F 13/42
(Continued)

FOREIGN PATENT DOCUMENTS

WO        2018231225 A1    12/2018

OTHER PUBLICATIONS

European Search Report, European Application No. 19837224.5, mailed May 27, 2022, 24 pages.
(Continued)

*Primary Examiner* — Glenford J Madamba
*Assistant Examiner* — Hassan A Khan
(74) *Attorney, Agent, or Firm* — Stoel Rives LLP

(57) ABSTRACT

Disclosed are controller area network (CAN) nodes and associated methods for communicating through a CAN bus to form a set of communicatively coupled CAN nodes. A CAN node has, and is configured to monitor status of, one or both input and output devices for establishing a vehicle-carried warning system in which an event changing at least one input status causes a CAN message to be broadcast over the CAN bus to change at least one output status. Behavioral equations map input(s) to output(s), thereby resulting in
(Continued)

desired actions. Also disclosed is a graphical user interface (GUI) for configuring the behavioral equations.

23 Claims, 17 Drawing Sheets

(51) Int. Cl.
| | | |
|---|---|---|
| *B60W 50/10* | (2012.01) | |
| *B60W 50/14* | (2020.01) | |
| *H04L 12/40* | (2006.01) | |
| *H04L 41/0631* | (2022.01) | |
| *H04L 41/22* | (2022.01) | |
| *H04L 43/0817* | (2022.01) | |
| *H04M 1/247* | (2021.01) | |

(52) U.S. Cl.
CPC . *H04M 1/2477* (2013.01); *H04L 2012/40215* (2013.01); *H04L 2012/40273* (2013.01)

(58) Field of Classification Search
CPC .... H04L 41/22; H04L 43/0817; B60W 40/09; B60W 50/10; B60W 50/14; H04M 1/2477

See application file for complete search history.

(56) References Cited

U.S. PATENT DOCUMENTS

| | | | |
|---|---|---|---|
| 2013/0055244 A1 | 2/2013 | Cannon, III et al. | |
| 2013/0198737 A1* | 8/2013 | Ricci | B60R 25/01 717/174 |
| 2013/0198802 A1* | 8/2013 | Ricci | H04L 67/12 726/28 |
| 2013/0200991 A1* | 8/2013 | Ricci | G06F 3/0488 340/4.3 |
| 2013/0203400 A1* | 8/2013 | Ricci | H04M 1/72463 455/418 |
| 2013/0204466 A1* | 8/2013 | Ricci | H04L 12/6418 701/2 |
| 2013/0204484 A1* | 8/2013 | Ricci | G06F 17/00 701/29.6 |
| 2013/0204493 A1* | 8/2013 | Ricci | G06F 11/2038 701/1 |
| 2013/0204943 A1* | 8/2013 | Ricci | G06F 16/29 709/204 |
| 2013/0205026 A1* | 8/2013 | Ricci | G06F 3/0484 709/225 |
| 2013/0205412 A1* | 8/2013 | Ricci | G06F 3/0484 726/29 |
| 2013/0211623 A1* | 8/2013 | Thompson | H04L 67/12 701/1 |
| 2013/0218412 A1* | 8/2013 | Ricci | G06F 11/2025 701/36 |
| 2013/0219039 A1* | 8/2013 | Ricci | G06F 3/0488 709/223 |
| 2013/0227648 A1* | 8/2013 | Ricci | H04W 12/088 726/3 |
| 2013/0282238 A1* | 10/2013 | Ricci | G06Q 10/00 701/99 |
| 2014/0143839 A1* | 5/2014 | Ricci | H04N 21/25858 726/4 |
| 2015/0149912 A1 | 5/2015 | Moore | |
| 2016/0129882 A1* | 5/2016 | Thompson | G07C 5/0816 701/2 |
| 2016/0369761 A1* | 12/2016 | Schnellinger | F02N 11/0866 |
| 2017/0085319 A1 | 3/2017 | Latham et al. | |
| 2017/0230385 A1* | 8/2017 | Ruvio | H04W 12/12 |
| 2018/0167212 A1* | 6/2018 | Walrant | H04W 12/06 |
| 2018/0167216 A1* | 6/2018 | Walrant | H04L 9/0894 |
| 2018/0349612 A1* | 12/2018 | Harel | G06F 11/0793 |
| 2020/0273268 A1* | 8/2020 | Bhattacharyya | G06Q 10/06315 |

OTHER PUBLICATIONS

Partial European Search Report, European Application No. 19837224. 5, mailed Feb. 24, 2022, 9 pages.

International Search Report and Written Opinion for International Application No. PCT/US2019/020132, mailed Jul. 10, 2019, 9 pages.

* cited by examiner

| | 7 6 5 4 3 2 1 0 | 7 6 5 4 3 2 1 0 | 7 6 5 4 3 2 1 0 | 7 6 5 4 3 2 1 0 | 7 6 5 4 3 2 1 0 | 7 6 5 4 3 2 1 0 | |
|---|---|---|---|---|---|---|---|
| Pattern Start | 1010 Repeats | 000 Pattern Enumeration | | | | | |
| All Off | 1101 Not Used | 0xx Variable Enumeration | Value (zero) | 0xx Variable Enumeration | Value | | etc. |
| Pattern Step | 1011 Period in milliseconds | 0xx Variable Enumeration | Value | 0xx Variable Enumeration | Value | | etc. |
| Pattern Step | 1011 Period in milliseconds | 0xx Variable Enumeration | Value | | | | |
| Pattern Start | 1010 Repeats | 000 Pattern Enumeration | | | | | |
| All Off | 1101 Not Used | 0xx Variable Enumeration | Value (zero) | 0xx Variable Enumeration | Value | | etc. |
| Repeat Section Start | 1110 Repeats | | | | | | |
| Pattern Step | 1011 Period in milliseconds | 0xx Variable Enumeration | Value | 0xx Variable Enumeration | Value | | etc. |
| Pattern Step | 1011 Period in milliseconds | 0xx Variable Enumeration | Value | 0xx Variable Enumeration | Value | | etc. |
| Repeat Section End | 1111 Not Used | | | | | | |
| Pattern Step | 1011 Period in milliseconds | 0xx Variable Enumeration | Value | 0xx Variable Enumeration | Value | | etc. |
| Pattern Start | 1010 Repeats | 000 Pattern Enumeration | | | | | |
| All Off | 1101 Not Used | 0xx Variable Enumeration | Value (zero) | 0xx Variable Enumeration | Value | | etc. |
| Pattern Step | 1011 Period in milliseconds | 0xx Variable Enumeration | Value | 0xx Variable Enumeration | Value | | etc. |
| Nested Pattern Step | 1100 Repeats | 000 Pattern Enumeration | | | | | |
| Pattern Step | 1011 Period in milliseconds | 0xx Variable Enumeration | Value | 0xx Variable Enumeration | Value | | etc. |

Fig. 8

|  | 7 6 5 4 3 2 1 0 | 7 6 5 4 3 2 1 0 | 7 6 5 4 3 2 1 0 | 7 6 5 4 3 2 1 0 |
|---|---|---|---|---|
| Pattern Start | 1010 \| Repeats \| 0xx | Pattern Enumeration | | |
| All Off | 1101 \| Not Used | Value (Dictionary Key) | | |
| Pattern Step | 1011 | Period in milliseconds | Value (Dictionary Key) | |
| Pattern Step | 1011 | Period in milliseconds | Value (Dictionary Key) | |
| | | | | |
| Pattern Start | 1010 \| Repeats \| 0xx | Pattern Enumeration | | |
| All Off | 1101 \| Not Used | Value (Dictionary Key) | | |
| Repeat Section Start | 1110 \| Repeats | | | |
| Pattern Step | 1011 | Period in milliseconds | Value (Dictionary Key) | |
| Pattern Step | 1011 | Period in milliseconds | Value (Dictionary Key) | |
| Repeat Section End | 1111 \| Not Used | | | |
| | 1011 | Period in milliseconds | Value (Dictionary Key) | |
| | | | | |
| Pattern Start | 1010 \| Repeats \| 0xx | Pattern Enumeration | | |
| All Off | 1101 \| Not Used | Value (Dictionary Key) | | |
| Pattern Step | 1011 | Period in milliseconds | Value (Dictionary Key) | |
| Nested Pattern Step | 1100 \| Repeats \| 0xx | Pattern Enumeration | | |
| Pattern Step | 1011 | Period in milliseconds | Value (Dictionary Key) | |

FIG. 9

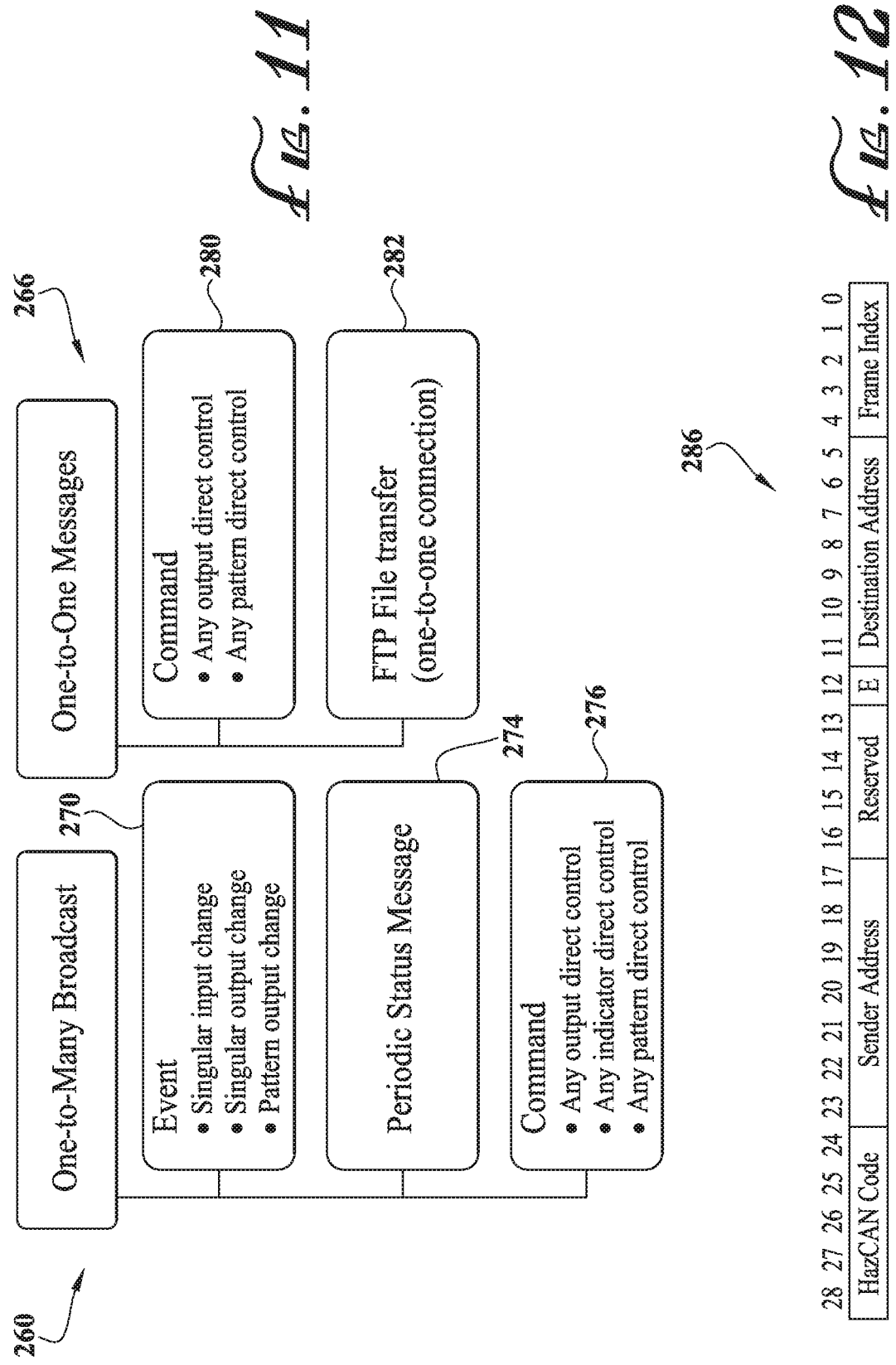

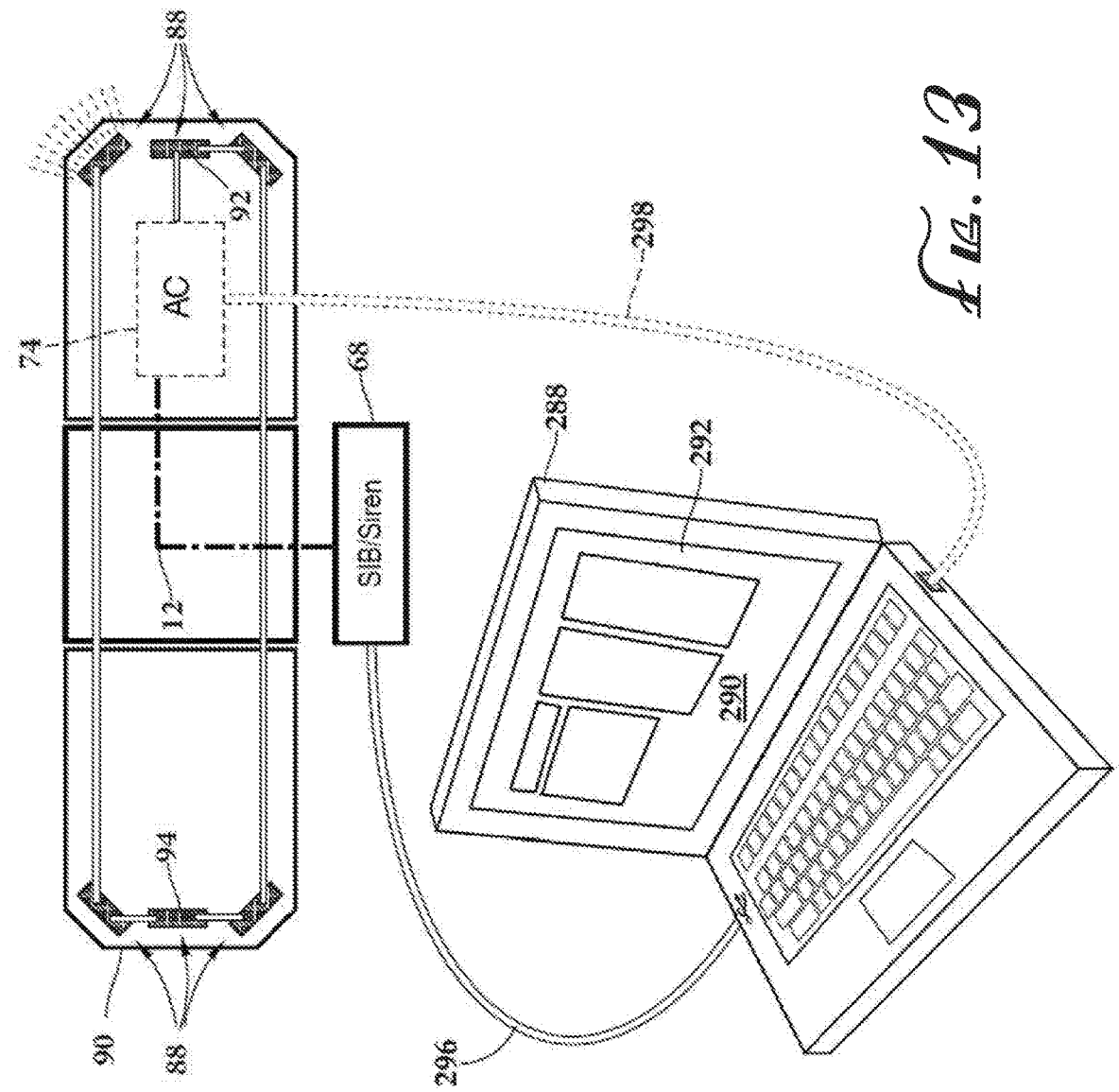

FIG. 15

Configuration  Test Flash Patterns  Help  Exit

INPUT DEVICES —328    Filter: [All Input Devices ▼]

- ⊙ GLOBAL INPUT STATES AND CONDITIONS
- ⊙ SERIAL INTERFACE BOX 24 PIN CONNECTOR
  - • WIRE HIGH  ○ WIRE LOW  —320

ACTIONS —332    Filter: [All Actions ▼]

- ◊ Double Flash 115
- ◊ Double Flash 150
- ◊ Triple Flash 60
- ◊ Triple Flash 150
- ◊ Quad Flash NFPA
- ◊ Quad Flash 150
- ◊ Five 75
- ◊ Five 150
- ◊ Six 60
- ◊ Six 80
- ⊟ Arrow Stik Patterns
  - ◊ Right Build Fast
  - ◊ Left Build Fast
  - ◊ Center Build Fast
  - ◊ Arrow Flash Simultaneous Fast
- ⊟ Light Patterns
  - ◊ Alley Right Steady
  - ◊ Alley Left Steady
  - ◊ Takedowns Steady
- ⊟ Cruise Mode Patterns
  - ◊ Cruise Mode
- ⊟ Timed Cut Patterns
  - × Left Timed Cut
- ⊟ Cut Patterns
  - × Rear Lights/Corners Cut
  - × Front Lights/Corners Cut

CONFIGURATION —336

- ⊟ Input 9: Red/Black Wire (High)
- ⊟ SERIAL LIGHT BAR
  - ⊟ Standard Patterns
    - ◊ Sweep ✦
- ⊟ Input 9: Red/Black Wire (High)
- ⊟ Input 10: White/Black Wire (High)
- ⊟ SERIAL LIGHT BAR
  - ⊟ Standard Patterns
    - ◊ Dual End Rotate ✦
- ⊟ Input 9: Red/Black Wire (High)
- ⊟ Input 10: White/Black Wire (High)
- ⊟ Input 11: Green/Black Wire (High)
- ⊟ SERIAL LIGHT BAR
  - ⊟ Standard Patterns
    - ◊ Pursuit ✦

326 / 292

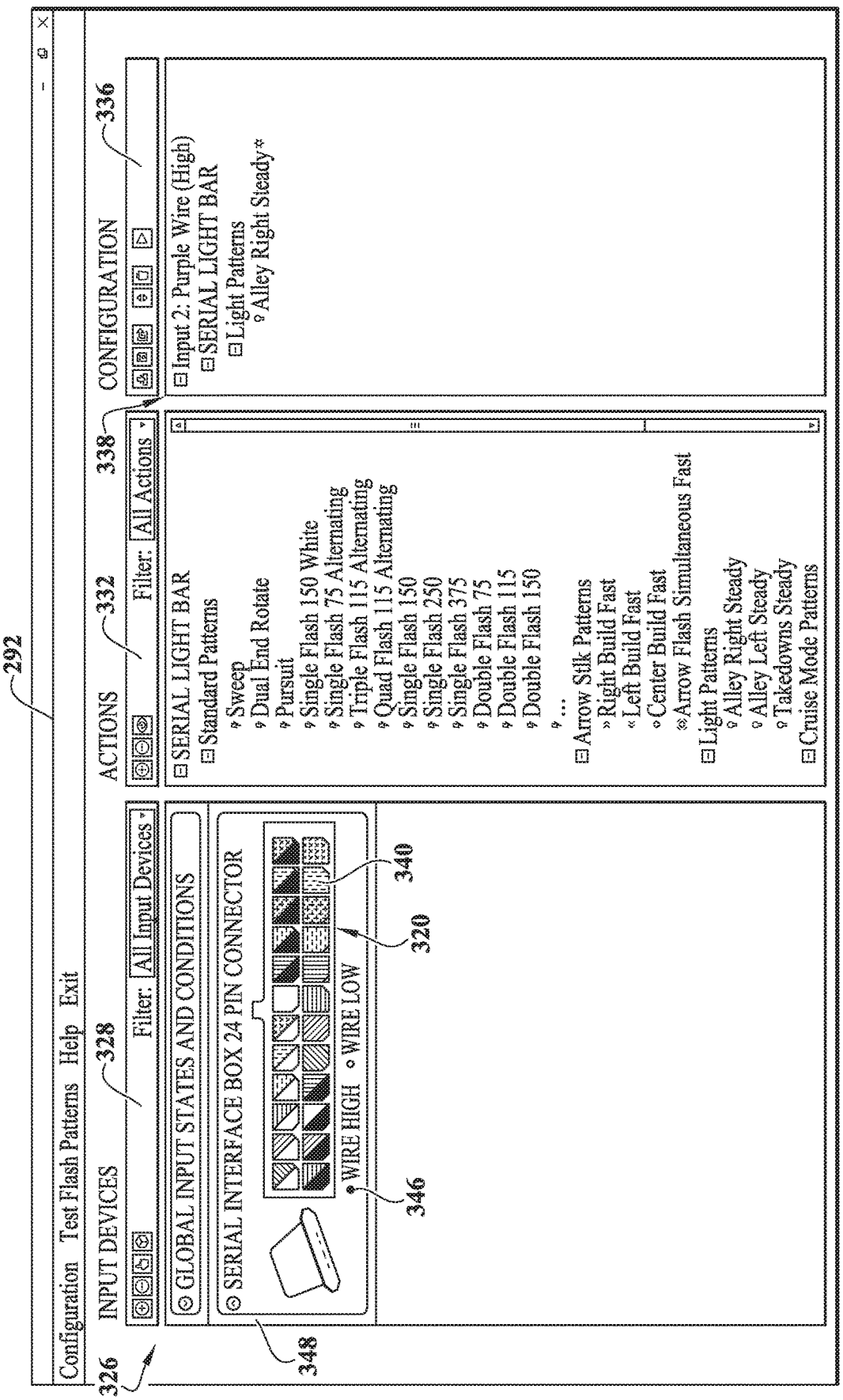

Fig. 19

CONTROL OF VEHICLE-CARRIED WARNING SYSTEM THROUGH CONTROLLER AREA NETWORK (CAN) COMMUNICATIONS OF GLOBAL VARIABLES PROCESSED AS OPERANDS OF BEHAVIORAL EQUATIONS

RELATED APPLICATIONS

This application is a National Stage of International Application No. PCT/US2019/020132, filed Feb. 28, 2019, which claims priority benefit of U.S. Provisional Patent Application No. 62/700,724, filed Jul. 19, 2018, the disclosures of both of which are hereby incorporated by reference in their entireties.

TECHNICAL FIELD

In general, this disclosure relates to a vehicle-carried warning system including serially connected warning devices such as sirens, lightbars, light modules (also called light engines and—according to the Society of Automotive Engineers (SAE)—light heads) or another class-one type of directional flashing optical warning devices for authorized emergency, maintenance, and service vehicles. In particular, this disclosure relates to an improved control paradigm and messaging platform for controlling the behavior of the serially connected warning devices.

BACKGROUND INFORMATION

Electronic Controls Company (ECCO) of Boise, Idaho, which is the assignee of this patent application, and its related companies such as Code 3, Inc. of St. Louis, Missouri (collectively referred to as ECCO Safety Group, or ESG) offer vehicle safety systems including a customer-selected mix of devices selected from the various ESG product lines. Compatibility among the devices provides customers some flexibility in designing their vehicle-carried warning systems.

The controller area network (CAN) standard describes a message-based protocol originally designed for multiplexing electrical wiring within automobiles, but it has uses in many other contexts. For example, CAN is commonly employed in the automotive industry to facilitate communications that need not include a host, for controlling communications between various microcontrollers and so-called Electronic Control Units (ECUs, more generally known as CAN nodes, or simply nodes). In other words, CAN is a multi-master serial bus standard for connecting two or more nodes for serial communications.

Robert Bosch GmbH published several versions of the CAN specification, the latest of which is CAN 2.0 published in 1991. This specification has two parts: part A describes a so-called standard format for a CAN message having an 11-bit identifier field, and part B describes the so-called extended format having a 29-bit identifier. A CAN device employing standard format 11-bit identifiers is commonly called a CAN 2.0A (compliant) device, whereas a CAN device employing extended format 29-bit identifiers is commonly called a CAN 2.0B device. Furthermore, in 1993 the International Organization for Standardization (ISO) released the CAN standard ISO 11898 that developed into the following three parts: ISO 11898-1, which specifies the data link layer; ISO 11898-2, which specifies the CAN physical layer for high-speed CAN implementations; and ISO 11898-3, which specifies the CAN physical layer for low-speed, fault-tolerant CAN implementations.

SUMMARY OF THE DISCLOSURE

The Matrix® (or simply, Matrix) is a software communications protocol and set of associated software libraries for a CAN serial data bus that provides a flexible, standardized means of interoperation between vehicle safety equipment controllers and devices, such as lightbars, warning signs, sirens, and other devices. Matrix allows the various ESG products to cooperate as peers, in the absence of a central controller or specific foreknowledge of peer functionality. In other words, the Matrix system need not employ a dedicated central controller, and if a Matrix node is removed or otherwise not communicating, then the communications and associated system behaviors of the remaining nodes are uninterrupted.

More generally, the protocol and associated libraries improve system performance in at least the following five ways. First, they allow more products from various companies to be integrated into a system. Second, they allow more controllers within a system to operate in concert. Third, they increase the number of devices able to share a CAN bus via message compression. Fourth, they increase system customization options via behavioral bytecode. Fifth, they allow new devices and features to be added readily via extensible protocol.

Additional aspects and advantages will be apparent from the following detailed description of embodiments, which proceeds with reference to the accompanying drawings.

BRIEF DESCRIPTION OF THE DRAWINGS

FIGS. 8 and 9 are annotated tables showing how flash pattern definitions are formatted into steps of one or more tokens.

FIG. 11 is an annotated block diagram of different message types.

FIG. 12 is an annotated table showing CAN message fields for conveying tokens.

FIG. 13 is a block diagram showing a graphical user interface (GUI) configuration session.

FIGS. 14-19 are screenshots of the GUI of FIG. 13.

DETAILED DESCRIPTION OF EMBODIMENTS

Matrix is analogous to an ESG safety system operating as a monolithic object-oriented computer program that is actually realized by multiple CAN nodes. A node on a CAN serial data bus (CAN bus, or simply CAN) is a device that communicates over the CAN bus, which is also referred to as a network. Such devices can be generally thought of as input devices, output devices, or hybrid devices (such as translators to other networks). An input device refers to keypads having dedicated keys, touchscreens, or both; an on-board diagnostics (OBD) controller; wire inputs from a SIB or junction box (J-Box); or other such devices shown in and described later with reference to FIGS. 3 and 5. An output device refers to lightbars, beacons, message signs, sirens, speakers, or wire outputs available from a J-Box and the like. Each device acting as a CAN node-a keypad, lightbar, siren, or other device—is analogous to a virtual object sharing global variables with the other virtual objects. Each device, therefore, regularly checks its set of behavioral equations that binds its resources—i.e., the operative states of inputs or outputs—to global variables maintained among the nodes. Thus, such behavioral equations can employ both math and logic operations to update variables and thereby tailor the desired system behavior as the updates are propagated to other nodes. Following a brief overview of example physical CAN bus configurations and associated devices shown and described with reference to FIGS. 1-3, this disclosure describes Matrix and, in particular, behavioral equations and the capabilities it facilitates, including ad-hoc system state synchronization (i.e., a master device need not control the system) and, among other things, a drag-and-drop GUI configuration of devices (called Matrix Configurator).

Figure 1:
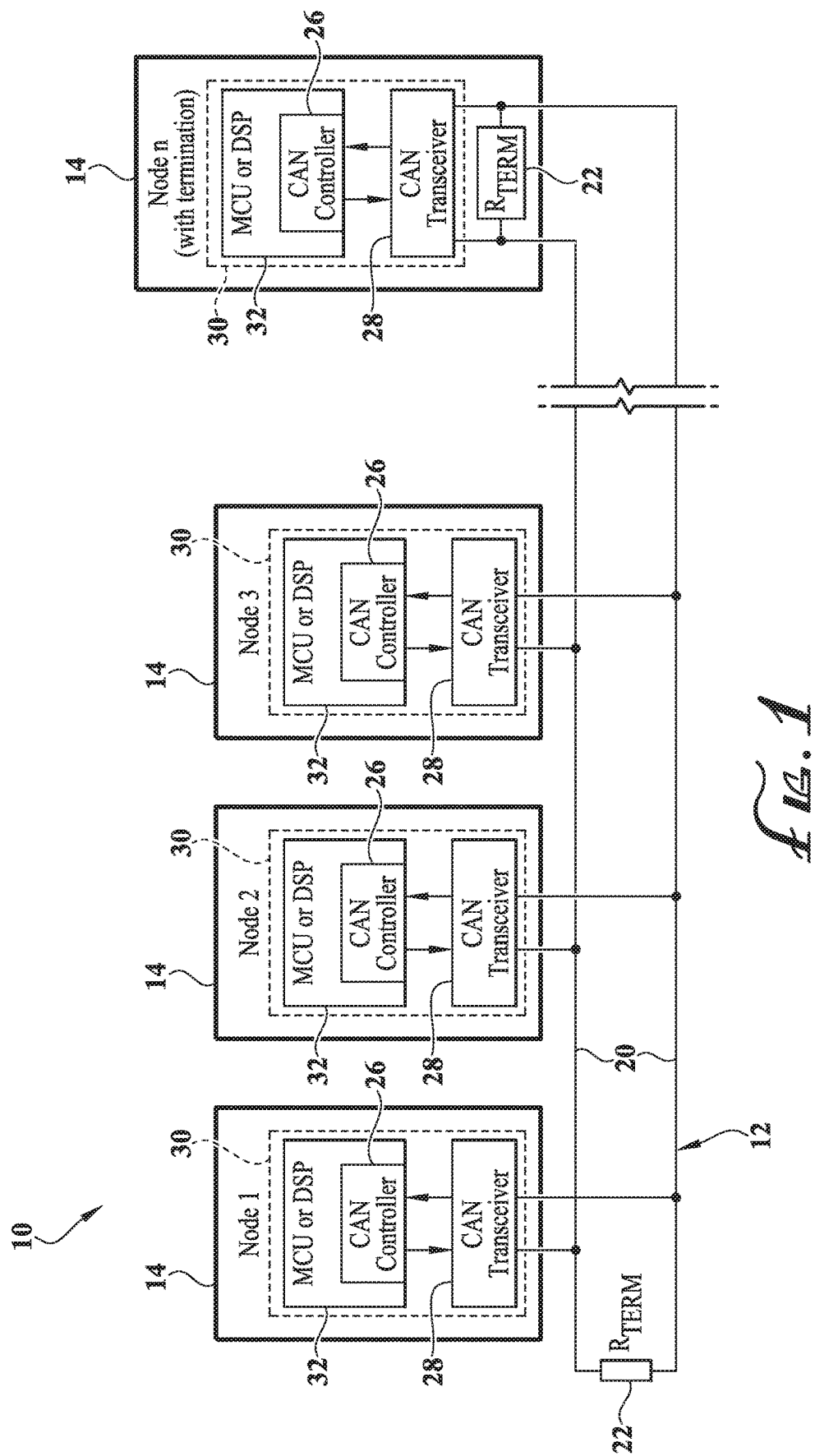
FIG. 1 is a block diagram of a high-speed ISO 11898-2 serial network.

FIG. 1 shows an example implementation of a high-speed network 10 formed by a linear CAN serial data bus 12 including multiple CAN nodes 14 connected to one another through two wires 20 terminated at each end with 120 ohm (2) resistors 22 equal to the characteristic impedance of the line (to prevent signal reflections). Wires 20 are 120 (nominal twisted pair cable, according to one embodiment, consistent with the ISO 11898-2 standard specifying the interconnect to be a twisted-pair cable (shielded or unshielded) with 120-Ω characteristic impedance (ZO). Termination may be on a cable or in a node as shown at, respectively, the left- and right-hand sides of FIG. 1.

CAN 12 supports up to 40 meters (m) total bus length, up to 120 nodes, extended frame format B with 29-bit identifier, up to one megabit per second (Mbit/s or Mb/s, often abbreviated "Mbps") also capable of operating at the 125 kilobits per second (kbit/s or kb/s, often abbreviated "kbps") baud rate for the extended frame format, eight quanta per bit, sample point 75% (six quanta before and two quanta after), and a re-sync jump that is two quanta.

FIG. 1 also shows that each one of nodes 14 includes a CAN controller 26 and a CAN transceiver 28. CAN controller 26 includes, for example, embedded logic implementing the CAN protocol. And CAN transceiver 28 provides a circuitry interface to the physical CAN bus. These two components are sometimes packaged together in a common integrated circuit (IC) 30 that includes a microcontroller, digital signal processor (DSP), or other logic controller 32 such as a central processing unit (CPU), a reduced instruction set computing (RISC) processor, a complex instruction set computing (CISC) processor, a graphics processing unit (GPU), an application specific integrated circuit (ASIC), another type of controller, or any suitable combination thereof. Skilled persons will appreciate that a complete CAN communications solution may also be referred to generally as a CAN controller or CAN (node) circuitry. The terms circuitry and processor circuitry refer to, may be part of, or include an ASIC, an electronic circuit, a processor (shared, dedicated, or group), or memory (shared, dedicated, or group) that executes one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially realized in hardware.

According to one embodiment of FIG. 1, IC 30 controls a lightbar (see, e.g., FIG. 3) and is a member of the Programmable System-on-Chip (PSoC®) 4200-L product family of programmable embedded system microcontrollers available from Cypress Semiconductor Corporation of San Jose, California. The PSoC® 4200-L product family is based on a scalable and reconfigurable platform architecture including an ARM® Cortex®-M0 CPU. The product family is characterized by its combination of microcontroller with digital programmable logic, and including programmable analog, programmable interconnect, secure expansion of memory off-chip, analog-to-digital converters (ADCs), operational amplifiers with a comparator mode, and standard communication and timing peripherals. For facilitating serial communications, the microcontroller includes four independent run-time reconfigurable serial communication blocks (SCBs) with reconfigurable I2C, SPI, or universal asynchronous receiver/transmitter (UART) functionality; USB Full-Speed device interface at 12 Mbps with Battery Charger Detect capability; and two internal CAN 2.0B node circuitry components, each of which includes independently controllable CAN controllers for industrial and automotive networking.

In another embodiment, IC 30 controls a light head and is an ATmega16M1 automotive 8-bit AVR® microcontroller available from Atmel Corporation of San Jose, California. This type of microcontroller includes, among other things, 16 kilobytes of in-system memory; internal CAN node circuitry (e.g., a CAN 2.0A/B controller); a 10-bit ADC having up to 11 single ended channels; and an on-chip temperature sensor for communicating temperature information.

Figure 2:
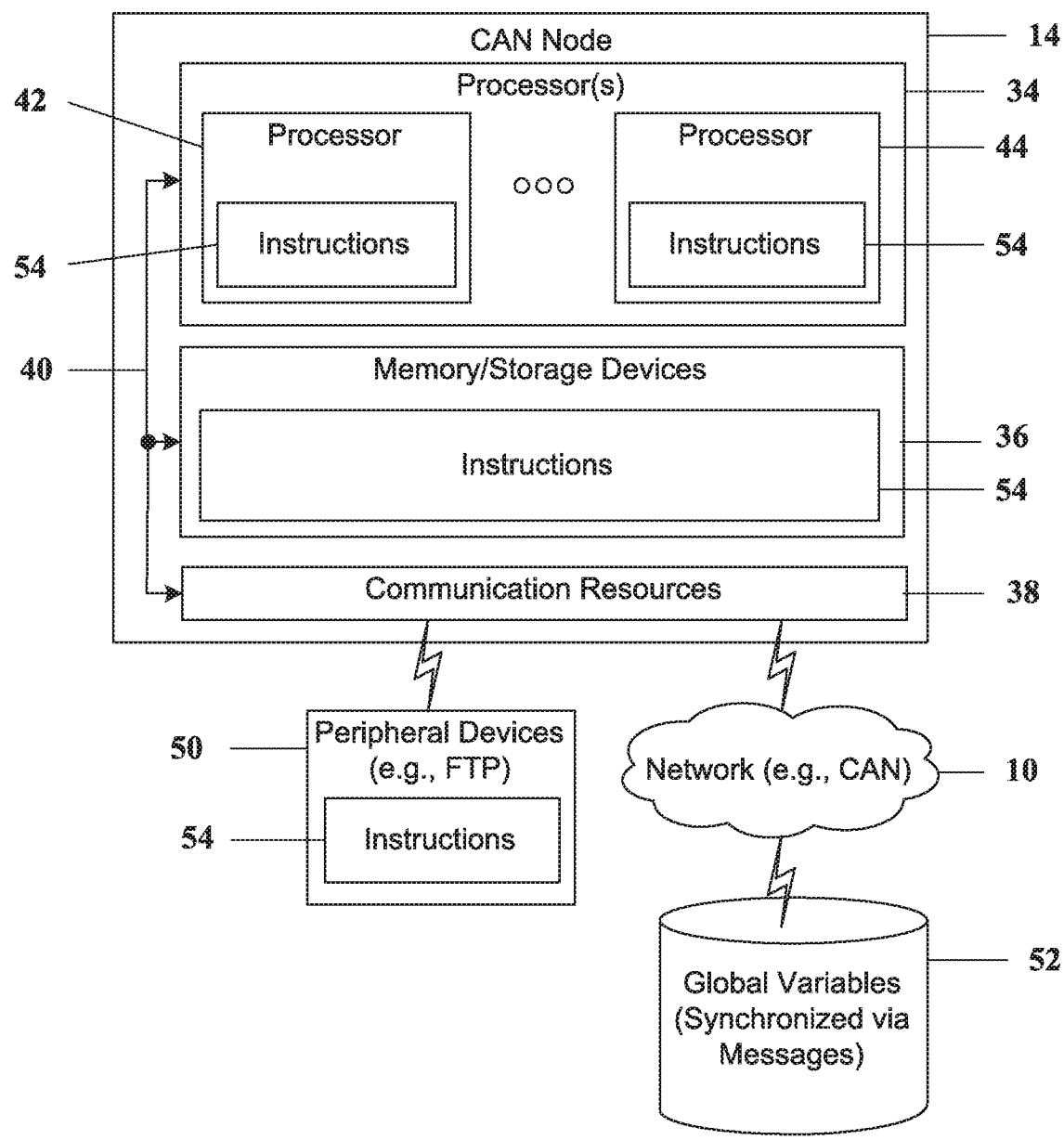
FIG. 2 is a block diagram of a CAN node, according to one embodiment.

More generally, embodiments described herein may be implemented in any suitably configured hardware and software resources of CAN node 14, such as those shown in FIG. 2. And various aspects of certain embodiments may be implemented using hardware, software, firmware, or a combination thereof, for reading instructions from a machine- or computer-readable non-transitory storage medium and thereby performing one or more of the methods realizing the Matrix communications and control techniques described later. Specifically, CAN node 14 includes one or more microcontrollers 34, one or more memory/storage devices 36, and one or more communication resources 38, all of which are communicatively coupled via a bus or other circuitry 40.

Microcontroller(s) 34, may include, for example, a processor 42 (shared, dedicated, or group), an optional processor (or additional processor core) 44, an ASIC or other controller to execute one or more software or firmware programs, a combinational logic circuit, or other suitable components that provide the described functionality.

Figure 10:
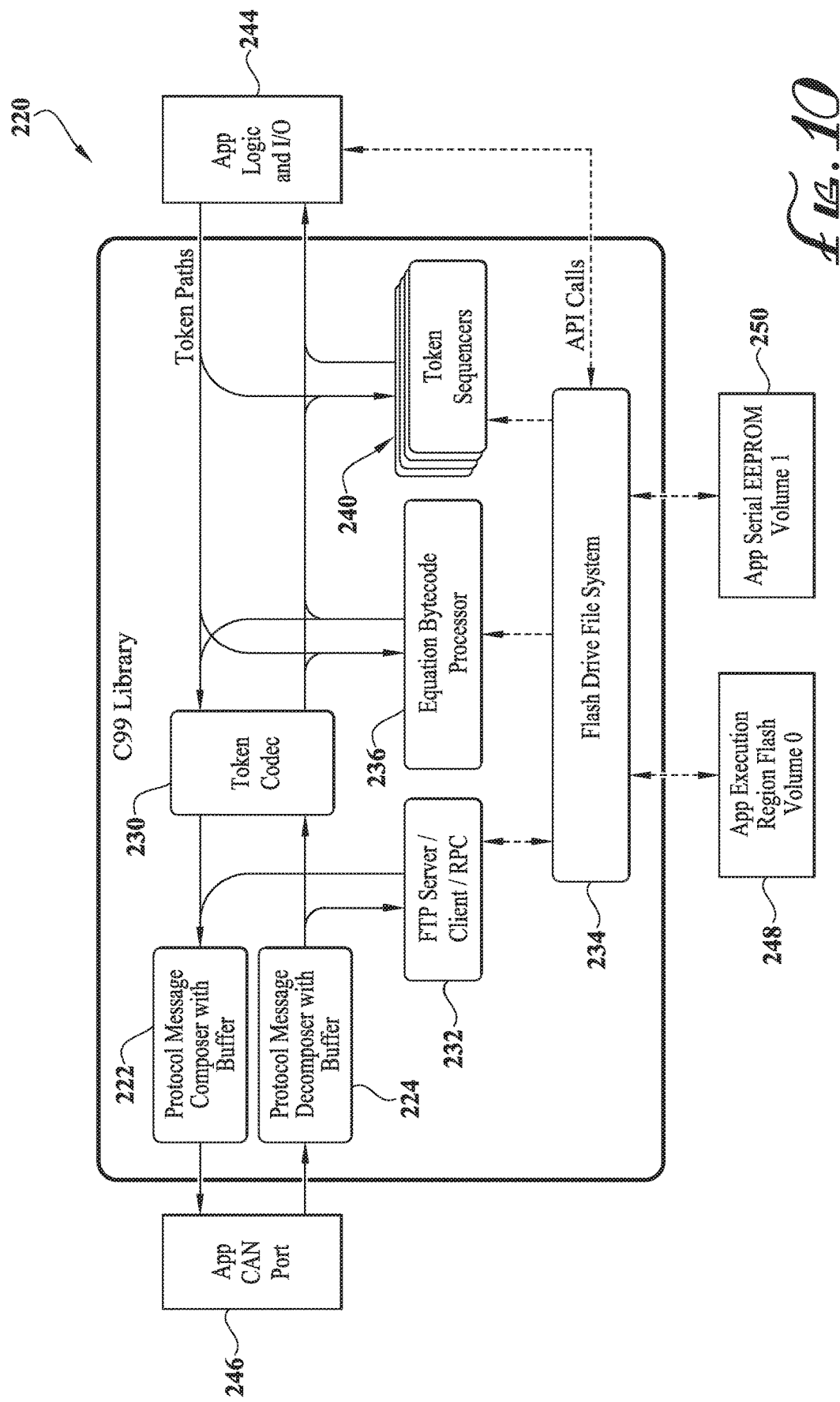
FIG. 10 is an annotated block diagram showing modules of a software library of Matrix.

Memory/storage devices 36 may include main memory, cache, flash storage, or any suitable combination thereof. Additional examples are shown in FIG. 10. A memory device 36 may also include any combination of various levels of non-transitory machine-readable memory including, but not limited to, electrically erasable programmable read-only memory (EEPROM) having embedded software instructions (e.g., firmware), dynamic random-access memory (e.g., DRAM), cache, buffers, or other memory devices. In some embodiments, memory may be shared among the various processors or dedicated to particular processors.

Communication resources 38 (e.g., CAN node circuitry) include physical and network interface components or other suitable devices to communicate via a network 10 with one or more peripheral devices 50 (see, e.g., programming workstation of FIG. 13) or one or more other devices collectively storing global variables 52 that are described later. Communication resources 38 may also include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 54 may comprise software, a program, an application, an applet, an app, or other executable code for causing at least any of microcontroller(s) 34 to perform any one or more of the methods discussed herein. Instructions 54 may reside, completely or partially, within at least one of microcontroller(s) 34 (e.g., within a processor's cache memory), memory/storage devices 36, or any suitable combination thereof. Furthermore, any portion of instructions 54 may be transferred to CAN node 14 from any combination of peripheral devices 50 or the other devices storing global variables 52. Accordingly, memory of microcontroller(s) 34, memory/storage devices 36, peripheral devices 50, and the other devices are examples of computer-readable and machine-readable media.

Instructions 54 may also, for instance, comprise one or more physical or logical blocks of computer instructions, which may be organized as a routine, program, object, component, data structure, text file, or other instruction set facilitating one or more tasks or implementing particular data structures or software modules. A software module, component, or library may include any type of computer instruction or computer-executable code located within or on a non-transitory computer-readable storage medium. In certain embodiments, a particular software module, component, or programmable rule may comprise disparate instructions stored in different locations of a computer-readable storage medium, which together implement the described functionality. Indeed, a software module, component, or programmable rule may comprise a single instruction or many instructions, and may be distributed over several different code segments, among different programs, and across several computer-readable storage media. Some embodiments may be practiced in a distributed computing environment where tasks are performed by a remote processing device linked through a communications network.

Instructions 54, for example, include .Net and C libraries providing machine-readable instructions that, when executed by a processor, cause processors of the nodes to perform Matrix features, including automatically maintaining a set of global variables in synchronism across the network. In addition, as shown in and described later with reference to FIG. 10, such libraries implement file transfer protocol, flash file system, behavioral equation processor, and multi-channel pattern sequencer. Thus, Matrix is a general term used as shorthand when referring to the communications protocol, underlying standards for enumeration of global variables and patterns, or the various formats and syntax for behavioral equations, pattern tables, product identification, and product assembly models.

Figure 3:
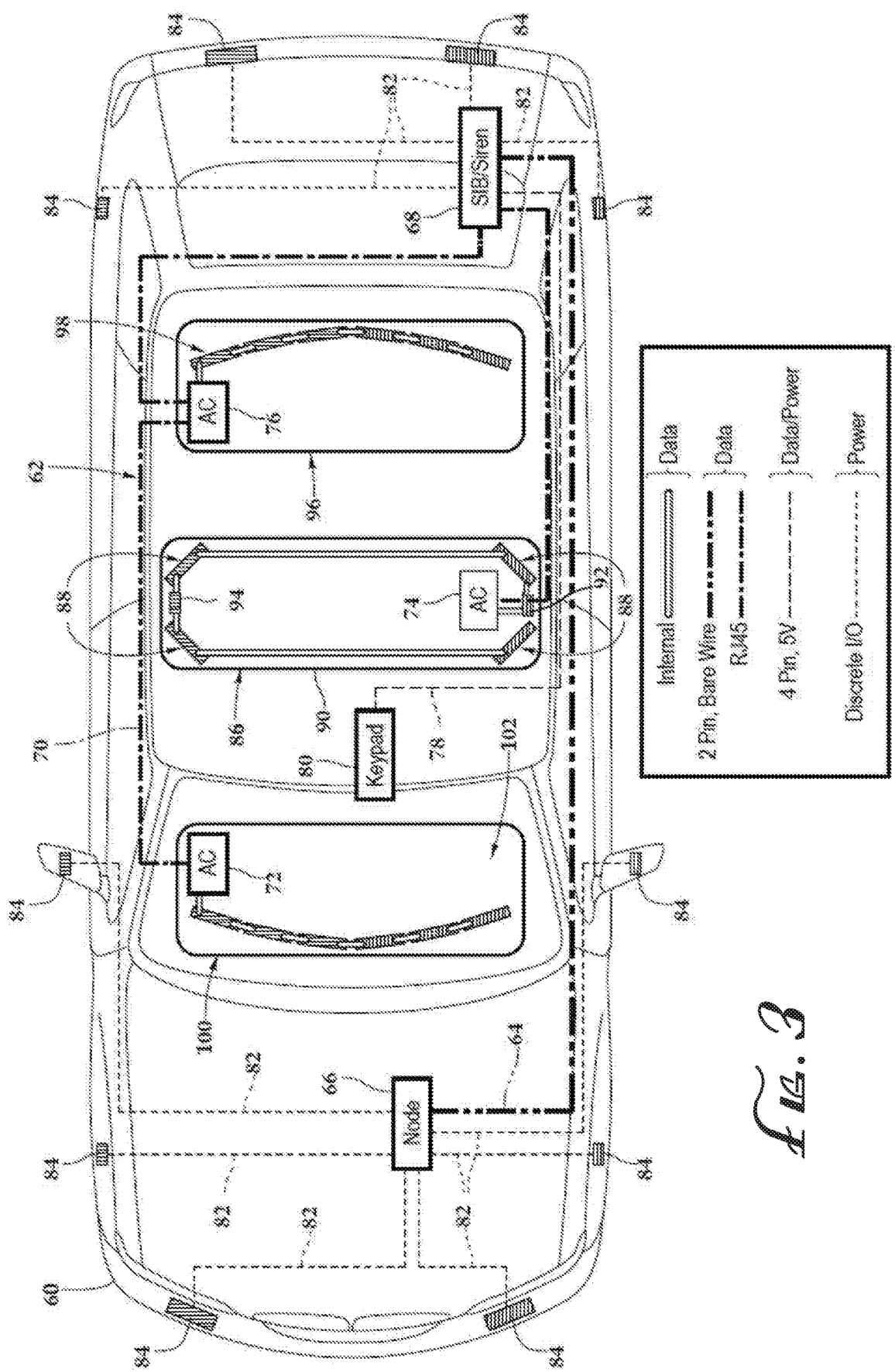
FIG. 3 is a top plan outline view of an emergency vehicle on which is superimposed a block diagram showing the serial network of FIG. 1, the network including light modules and other nodes deployed throughout the emergency vehicle.

FIG. 3 shows an overhead view of an outline of an emergency vehicle 60 having an embedded serial network (or bus) 62 of external warning systems and associated controllers including distributed nodes and light heads arranged about the perimeter of vehicle 60. Embedded serial network 62 implements CAN serial data bus 12 (FIG. 1) of Matrix, according to one embodiment.

The underlying physical wiring employed in Matrix includes a variety of wiring options such as, for example, two-pin data wires 64 between a signal distribution node 66 and a SIB 68; a data cable 70 connection between SIB 68 and three array controllers (ACs) 72, 74, 76 having 8 position, 8 contact (8P8C) plug connectors (not shown) commonly referred to as RJ45 modular connectors in the context of Ethernet-type cables; a four-pin, five volt (V) data and power line 78 between a keypad 80 for selecting illumination settings (e.g., dim level, flash pattern, and other settings) and SIB 68; and discrete I/O (e.g., power on-off cycling) cables 82 to non-serially connected light heads 84 actuated by signal distribution node 66.

SIB 68 is a dedicated controller node having a personal computer (PC) interface that, as explained later with reference to FIGS. 13-19, enables end users to readily reconfigure their system. SIB 68 also includes dedicated memory space by which to maintain network-level status logs. SIB 68 communicatively couples several different Matrix nodes that employ the aforementioned different cable connections while also providing optional auxiliary features, such as an interface for discrete I/O or a siren.

In another embodiment, Matrix operates without a SIB, at the discretion of the end user weighing cost, complexity, and desired functionality. For example, in principle, any combination of two or more Matrix nodes could form an autonomous system. This is so because priority functions and system synchronization are accomplished via the CAN message structure of the bus itself. CAN differs from other common embedded networks in that it operates with a multi-master structure. There is no host controller per se, such as in a USB, and no master-slave relationship per se, such as in a Serial Peripheral Interface (SPI) bus.

Any CAN nodes communicatively coupled through bus 62 may be provided by a different original equipment manufacturer (OEM). And the complexity of a CAN node can range from a simple I/O device to a complex embedded computer having an integrated CAN controller and relatively sophisticated software. A node may also be a gateway allowing a standard computer (see, e.g., FIG. 13) to communicate over a USB, Ethernet, or other port to the devices on a CAN network. Accordingly, bus 62 facilitates interoperability between products independently developed by OEMs and partners.

A rooftop array 86 of light heads 88 (i.e., multiple light engines in a lightbar 90) includes, among other things, an alley left light 92 and an alley right light 94, which will serve as the basis for several later-described examples of the Matrix control paradigm established through global variables and behavioral equations.

Vehicle 60 and bus 62 also accommodate other types of arrays in lieu of or in addition to rooftop array 86. FIG. 3 shows several such arrays, although in practice most emergency vehicles will either have one rooftop array, front- and rear-facing arrays (e.g., for so-called slick-top vehicles), or some combination of rooftop and front- and rear-facing arrays. For instance, a rear-facing rooftop external array 96 (known as a Safety Director™ configuration) includes array controller 76 and multiple light heads 98. Similarly, a lower front windshield interior array 100 includes array controller 72 and multiple light heads 102. Additional slick-top embodiments (not shown) of arrays having a nested CAN bus available from Code 3, Inc. include an upper front windshield interior array arranged according to a SuperVisor® configuration; a lower rear window interior array arranged according to a WingMan™ configuration; and an upper rear window exterior array mountable to a fiberglass visor, which is also called a roof spoiler, arranged according to a Citadel™ configuration for sport-utility vehicles. In other embodiments (also not shown), a single array controller maintains multiple spaced-apart arrays.

The following paragraphs provide an overview of the concepts of variables and behavioral equations that are used to control a system in response to events. An input or output event is a change to an input or output status, and that information (conveyed in the form of variables) is broadcast over the CAN bus for consumption by other nodes that each evaluate a set of behavioral equations using variables as operands. In addition to events, for purposes of system redundancy, each node periodically broadcasts the status for its full set of inputs or outputs. For conciseness, an operative state of an input (or output) device is also referred to as input (or output) status. And an event, depending on the context, is an actual physical or logical event or the resulting event message, which is also referred to as an input (or output) status event. Also, note that the terms variables and tokens are sometimes used interchangeably, yet there are some distinctions.

A token is a container for communicating a variable and other optional data-such as an address-used to update variables communicated between application modules (i.e., a library resource, such as a sequencer or equation processor as shown in FIG. 10) and across the bus. In other words, a token includes a key-value pair, in which the number of the key represents a particular variable and the value is a new value for that particular variable. Tokens thereby encapsulate variables for transport within the operating system and across the network, thereby serving as a transport wrapper around a key-value pair. According to one embodiment, a token's key field represents a variable's 16-bit enumeration (explained later), and the token's value field stores new value of the variable in 32 bits. As an example of a public variable, an amplifier volume knob is a volume control (key) that has a current rotation (value). A remotely located amplifier may then input the variable into its equations and set the volume accordingly. Moreover, a token also includes fields for addresses and special processing flags described later.

Behavioral equations provide a mapping between system inputs and outputs using global and local variables that represent the operative state of components and features of the system. Accordingly, a Matrix device has a built-in equation processor including three primary functions: receive tokens from the bus and application layer so as to keep equation results up to date; broadcast a token over the Matrix bus whenever a result of an equation changes the value of a global variable; and periodically broadcast all global variable equations (e.g., about once per second) as a set of compressed tokens to maintain synchronization among the other nodes.

Equations are typically defined in an "equations.h" header file so as to take advantage of color parsing in an integrated development environment (IDE). Thus, firmware engineers having equations in a .h file would facilitate an IDE in properly highlighted source code of the equations. A DevTool program compiles source code text into bytecode for fast execution on a target device. The bytecode compiler understands C-language preprocessor symbols including #defines and #include for filenames in quotes but will ignore <system> files. Whitespace and hex numbers are acceptable to use in behavioral equations. And syntactical mistakes are identified by an equation compiler, which compiles the human read-readable equation text into the machine-readable bytecode. Before compilation, a preprocessor converts preprocessor symbols and enumerations to plain numbers.

The programming terms private and public are synonymous with, respectively, local and global. Specifically, local variables can represent intermediate values that are useful to simplify the behavioral equations. Local variables are sometimes used at the discretion of the product designer and are not visible to other devices on the network. Global variables are classified into three general types: command variables, input status, and output status.

Command variables bypass behavioral equations and directly control device outputs and token sequencers. Commands need not be used during normal operation and are typically used for diagnostics.

Input status variables indicate the state of inputs such as wires, buttons and other sensors. During normal operation, global variables maintain control of the system. An input status variable represents the state of a certain input, e.g., a voltage level of a green wire in a SIB, a button, or an OBD-II status code. When an input changes on a device, the device increments its global event order (to resolve which event occurred latest and thereby address situations that might otherwise be in conflict), and an input status event token is broadcast over the bus.

Output status variables indicate the state of outputs such as lights and sirens. An output status variable represents the state of an output, such as a LED or sequencer (described later). When an output changes, an output status token is broadcast over the bus.

Output status variables are typically informative in nature, unless a system designer intends to use them for closed-loop control feedback. System designers may choose how to best represent a user control state, either with a LED indicator or on graphic displays having different state images. In the case of a single LED per user control, designers must decide whether the LED represents the state of the control, or the state of the output device. Suppose for example that a system has been programmed to use two inputs to enable an alley light: a toggle button input and a door-not-closed switch. The designer might want the button indicator to be lit when the feature is on and ready, or the designer might want it to be lit when the alley light is actually on. This choice is subjective, as explained in the following examples of FIGS. 4 and 5. Implementation details in terms of the actual data structures, syntax, and other details are described later with reference to FIGS. 6-12.

Figure 4:
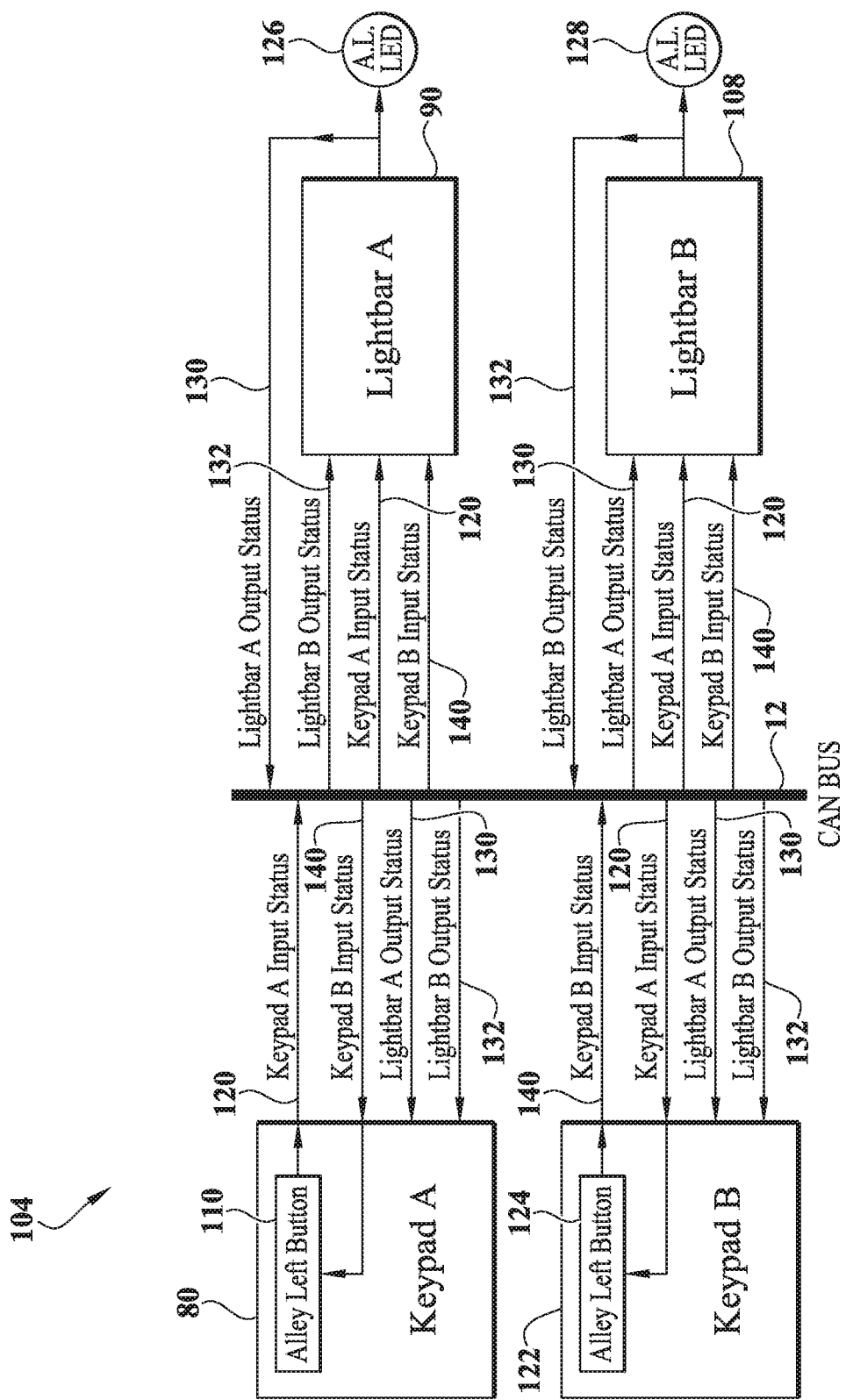
FIG. 4 is a block diagram of another network including two keypads and two lightbars.

In FIG. 4, a system 104 includes two lightbars: a Lightbar A 90 (FIG. 3) and Lightbar B 108. After an Alley Left Button 110 of a Keypad A 80 (FIG. 3) is pressed by a user, a system designer might intend for a LED indicator of button 110 to provide conclusive feedback that lightbars 90 and 108 are indeed running a flash pattern. Another designer, however, might not want the LED indicator to be lit if just one lightbar is responding. Thus, such closed-loop/open-loop decisions are left to the system designer. Matrix ensures that all devices are capable of either topology and various different desired behaviors.

In one embodiment, a user pressing button 110 causes a processor (not shown) of keypad 80 to increment its event counter and generate a Light_AlleyLeft input status event token broadcast in a message 120 communicated over CAN bus 12 to three other devices including a Keypad B 122, lightbar 90, and lightbar 108. An illumination state of an Alley Left Button 124 is changed to match that of keypad 80 upon evaluation of a behavioral equation mapping the input state (e.g., a button press) to a desired output state (e.g., indicator light illuminated).

More generally, when two virtual controls exist in system 104 and are controlled by the same token, a user changing one control will change the state of the other as well. Unlike physical controls, virtual user controls have the advantage of programmatic state changes. A control whose state is changed programmatically in response to a network event or status broadcast does not cause a rebroadcast of such a change to avoid bus oscillation.

In another embodiment, lightbar 90 has an Alley Left LED 126 that illuminates in response to message 120, but an Alley Left LED 128 of lightbar 108 is broken. Each lightbar device responds with differing output status event tokens in output status messages 130 and 132 to indicate actual states of LEDs 126 and 128. Indicator LEDs in keypads 80 and 122 could then be controlled by behavioral equations that account for the output status event tokens of messages 130 and 132, thereby providing actual feedback from lightbars 90 and 108. In this embodiment, so-called smart light heads are capable of producing a component failure warning and issue output status tokens (with the corresponding enumerations for the failed light) and an eight-bit failure code. Such tokens are issued when a failure occurs and no more often than once per second, according to some embodiments.

In still another embodiment, behavioral equations can be configured such that each keypad 80 and 122 can be configured to separately control and respond to, respectively, lightbar 90 and 108. In that case, lightbar 108 would illuminate in response to a message 140 and not message 120.

Cooperative mode is an optional method that allows both a physical and virtual control to use the same global variable. This mode works by letting the most recent input event control the global variable's value. For example, if both a wire input and a virtual switch control the Alley Left light, then the most recent user-caused input prevails. Cooperative mode allows a customer to not wire up inputs that are already controlled by other devices, such as the OBD-II input or keypads. Or a customer can choose to use both, similar to a three-way light switch in a home. Alternatively, a customer can just use a single input, which acts as the customer would expect.

Matrix libraries track the order of input status events so that, in the case of conflicting messages, the most recent event prevails. For example, message 120 also includes an incremented event number, which is used to reject subsequent and stale periodic status messages (e.g., stale messages that may have been built and queued for transmit prior to the button press event). Upon sending or receiving an event, a node's periodic status message may be slightly delayed from being built and queued by a minimum delay of about 15 ms. This delay inhibits a node from generating an event, incrementing the index, and—during a 1 ms period in which the event is being transmitted over the CAN bus—building and queuing a periodic status message with the same new index. Other nodes, however, may also generate event messages having the same event index during that 1 ms period. With the 15 ms delay, any such concurrent events will have the opportunity to be broadcast before the next periodic status messages are built. Accordingly, when keypad 122 later receives such a period message, it compares its local event counter to the event number of the message so as to determine whether there is actually a new event.

Figure 5:
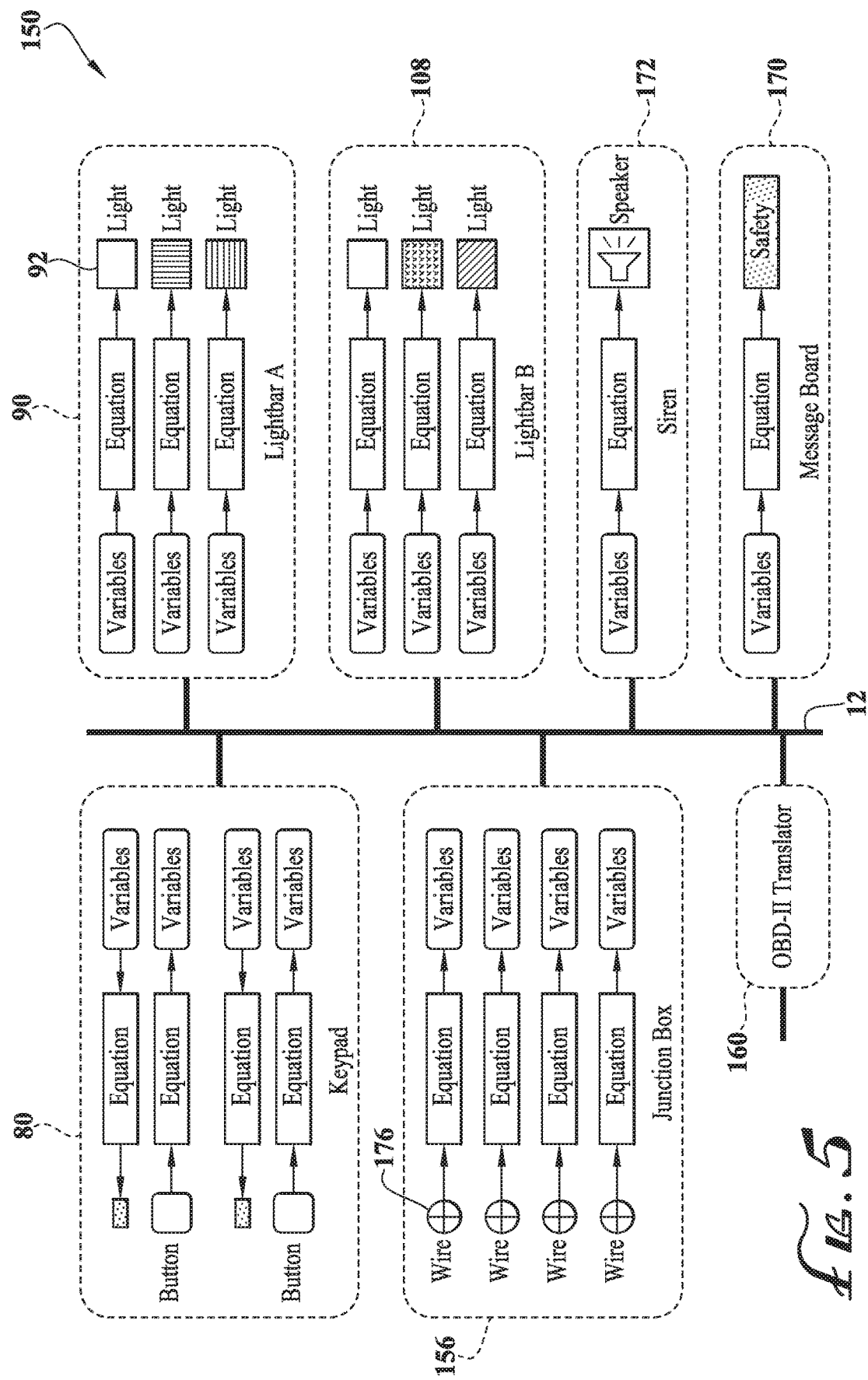
FIG. 5 is a block diagram of still another network showing how nodes therein possess variables and behavioral equations.

FIG. 5 shows another Matrix system 150 having CAN bus 12 for communication between keypad 80, a J-box (similar to SIB 68, FIG. 3) 156, an OBD-II translator 160 (mapping vehicle speed and other diagnostic messages to system outputs), a message board 170, a siren 172, and lightbar 90 and lightbar 108. For this system, the following green-wire example also demonstrates how behavioral equations configure the behavior of the system 150 by mapping inputs and outputs using a shared data structure, i.e., global variables.

When a dedicated (e.g., green) wire 176 of J-box 156 carries a high voltage signal, then that voltage signal indicates that a light (e.g., alley left light 92, FIG. 3) should be illuminated. To realize this desired behavior, a behavioral equation shown in Table 1 allows J-box 156 (i.e., its processor) to copy a logic value of a local Boolean variable representing the voltage signal on green wire 176 to a global variable named Light_AlleyLeft (an equation's left-hand expression is evaluated to produce the right-hand result).

TABLE 1

Example J-Box Equation local_var_green_wire = Light_AlleyLeft // both variables are Boolean In general, incoming tokens (including local or global variables) are used to update left-hand variables in a set of equations on a device. Global input status tokens, however, are used to update both left-hand and right-hand variables. This is done to keep all system inputs in synchronism. Thus, for public variable synchronization, left-hand expression public variables are synchronized to the same-named right-hand expression variables from other devices. Private variables are not synchronized. Right-hand expression public variables that are categorized as input status are synchronized to the same-named right-hand expression variables from other devices. This facilitates the synchronization of user controls. Additional discussion of Matrix message types that facilitate synchronism (e.g., event broadcasts, periodic status broadcasts, and device commands) are described in later passages.

Equations on a device are typically evaluated sequentially on a round-robin basis, distributing processing across multiple library clocks. Evaluation occurs regardless of whether new tokens arrive, to support some the time-logic functions discussed below.

In the green-wire example, an equation processor of J-box 156 processes an internal green-wire token provided by an internal software application that monitors the status of wire 176; updates the value of local_var_green_wire; reevaluates the equation of Table 1; and, since the value of Light_AlleyLeft has changed, generates an event token to be broadcast on CAN bus 12.

To update the new value of Light_AlleyLeft on all the other devices, a corresponding equation shown in Table 2 copies the value of the global Light_AlleyLeft variable to change the state of a local variable controlling an alley left light, and that light is illuminated. In fact, any alley left light on any Matrix-compliant device on the same CAN bus could have been illuminated.

TABLE 2

Example Lightbar Equation

Light_AlleyLeft = local_var_LED1

Lightbar 90 or 108 has an equation processor that evaluates the equation of Table 2 as follows: process the event token from CAN bus 12 and updated the Light_AlleyLeft variable; reevaluate the equation; and since the value of local_var_LED1 changed, generate a local token for a lightbar software application controlling the alley left light.

Skilled persons will appreciate that the aforementioned green-wire logic may be implemented in many different ways that do not include behavioral equations. For example, some updatable C source code could achieve a similar outcome in terms of controlling behavior. But, as the green-wire example suggests, defining global variables in behavioral equations allows Matrix to automatically keep such variables in synchronism across all devices on a bus. Behavioral equations can also be automatically generated based on a GUI for custom configurations, which would be burdensome if not for the behavioral equations defining device behavior. Moreover, behavioral equations may be used to logically combine several inputs into a single pattern trigger output, to scale output intensity based on a system state, and perform other functions. For example, behavioral equations provide for sophisticated functionality, such as establishing priorities in connection with use of a particular input or output resource, allowing combinations of inputs to turn on a common output, or setting an output intensity based on a secondary input, such as a light sensor scalar value (e.g., local_var_DIM in a range from 0-100), as shown in Table 3.

TABLE 3

Example Equation Including Scalar Math Operator

Light_AlleyLeft * local_var_DIM = local_var_LED1

According to one embodiment, a variable is fully enumerated by a fixed 13-bit base enumeration and a 3-bit prefix of the variable type: command as 0b000, output status as 0b001, and input status as 0b010, for example. The prefix allows one "base" variable name to be used for input, output, or command. The base and prefix form a 16-bit unsigned enumeration conveyed in lieu of strings so as to improve network efficiency.

The following SIB equations of Table 4 show that "IS" is a mask providing the aforementioned most-significant 3-bit prefix to resolve complete enumerations of global variables. For example, the fifth SIB input (pKeyPinInput5) maps to an alley left input status, e.g. 0x4000|0x03EE, because 0x4000 is the input status prefix mask defined in Table 5, according to one example.

At 16 bits, there are approximately 25,000 enumerations available (8,192 so-called base enumerations of 13 bits), some of which have dedicated names whereas others are represented in numerical form. For example, Table 4 also shows how some variables are named whereas others are indexed. Of the 24 SIB inputs, the first 18 are named. The last six are reserved and so have no name and are referred to in numerical form as indices 493-498. Named variables typically represent features that are common in the industry. "Light_AlleyLeft" is a named variable whose actual enumeration is 1006, in some embodiments. On the other hand, there are arrays of inputs or outputs that need not be named.

Those items can still be assigned one of the indexed input or output enumerations. With cooperation among the different OEMs, enumerations are non-overlapping.

In Table 4, equations have the name KeyLight_AlleyLeft instead of just Light_AlleyLeft. That is because those are enumerations from a file named "tokens.h," which uses the "Key" prefix to distinguish enumerated token keys from other general labels in the C language program. A designer may also include a separate file for local variables, with a name such as "private_keys.h." By convention, local app variables, which can be freely assigned in a region 1-199 of Table 6, are prefixed with a 'p,' as shown in Table 4 and FIG. 6.

TABLE 4

Example SIB Equations

// named variable mappings
$[pKeyPinInput5] = [IS | KeyLight_AlleyLeft]; -c@
$[pKeyPinInput6] = [IS | KeyLight_AlleyRight]; -c@
$[pKeyPinInput7] = [IS | KeyLight_Worklight]; -c@
$[pKeyPinInput8] = [IS | KeyLeftCut]; -c@
$[pKeyPinInput9] = [IS | KeyRearCut]; -c@
$[pKeyPinInput10] = [IS | KeyFrontCut]; -c@
// indexed variable mappings
$[pKeyPinInput19] = [IS | 493]; -c@
$[pKeyPinInput20] = [IS | 494]; -c@
$[pKeyPinInput21] = [IS | 495]; -c@
$[pKeyPinInput22] = [IS | 496]; -c@
$[pKeyPinInput23] = [IS | 497]; -c@
$[pKeyPinInput24] = [IS | 498]; -c@

TABLE 5

Example Prefix Masks

| | | |
|---|---|---|
| #define IS | 0x4000 | //input status prefix (e.g. 0x40 << 8) |
| #define OS | 0x2000 | //output status prefix (e.g. 0x20 << 8) |

Table 6 shows how base enumerations are organized into regions. Each region is associated with a set of either named or indexed variables, and value size of 0-4 bytes. The regions starting at 1,000 (i.e., the start of the Lights region) and ending at 8,159 (i.e., the end of the Misc. Zero-Byte region) are named variables, according to some embodiments. A file named "token_regions.h" describes the detailed working regions and sub-regions. The aforementioned file named "tokens.h" specifies variable value size, range, and structure. For example, a penultimate column of Table 6 shows example value sizes for one byte Boolean information, 8- and 16-bit analog values (e.g., for an analog value range of light or acoustic normalized intensity percentages between 0 and 100), and other sizes up to four bytes.

TABLE 6

Base Enumeration Regions

| Region | Start | Region Size | Value Size | Note |
|---|---|---|---|---|
| Local Variables | 1 | 199 | Varies | for private local variables, may be used for any purpose |
| Indexed Inputs | 200 | 300 | unsigned 8 bits (u8) | often a Boolean value for public indexed arrays of non-descript 8-bit inputs, |

TABLE 6-continued

Base Enumeration Regions

| Region | Region Start | Region Size | Value Size | Note |
|---|---|---|---|---|
| Indexed Outputs | 500 | 500 | u8 | e.g., graphics-based input device having arrays of user controls for public indexed arrays of non-descript 8-bit outputs, e.g., an array of light heads, responsive to commands tokens |
| Lights | 1,000 | 400 | u8 | named variables |
| Sounds | 1,400 | 400 | u8 | named variables |
| Messages | 1,800 | 200 | u8 | named variables |
| OBD-II | 2,000 | 1,000 | u8 | named variables |
| Misc. One-Byte | 3,000 | 2,000 | u8 | named variables |
| Misc. Two-Byte | 5,000 | 2,000 | unsigned 16 bits (u16) | named variables |
| Misc. Four-Byte | 7,000 | 1,000 | signed 32 bits (s32) | named variables |
| Misc. Zero-Byte | 8,000 | 160 | NA | named variables |
| FTP Requests | 8,160 | 10 | NA | used for, e.g., GUI programming |
| FTP Responses | 8,170 | 22 | NA | used for, e.g., GUI programming |

Figure 6:
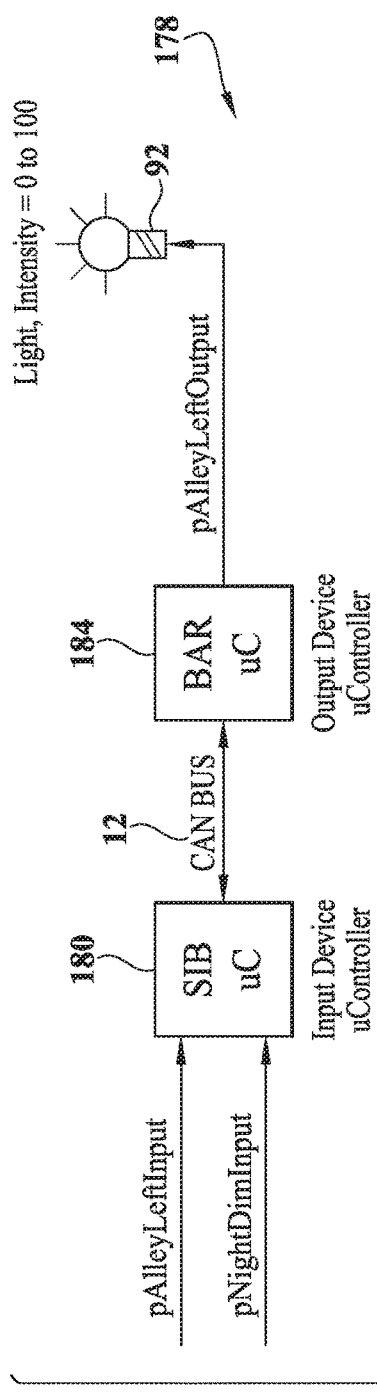
FIG. 6 is an annotated block diagram showing an example of serial-interface box (SIB) and lightbar behavioral equations for controlling an alley left light.

Additional syntax that is shown in FIG. 6 is also available for behavioral equations. Generally speaking, behavioral equations are written in a syntax that is similar to that of standard C computer programming language but with some other features. A first feature, mentioned above, is that the left-hand expression with one or more variables is evaluated and the result is stored in a single variable in the right-hand expression. A second feature is that variables are expressed as "[nnn]" where nnn is the variable enumeration. For example, in the equation of Table 7, the "100" is a constant (since it is not enclosed by square brackets) but "499" is a variable enumeration bitwise-OR'ed with the input status prefix defined in Table 5.

TABLE 7

Example Syntax $[pKeyPinInput24] * 100 = [IS | 499]; -c@,

Equations begin with one or more of the following evaluation control characters: "$$" means evaluate an equation that follows once per library clock cycle. '$' means evaluate sequentially with other '$' equations, one per library clock cycle. "+$" means evaluate when the preceding equation is evaluated. The logic operations of the equations end with the ';' character, and may be followed with post-processing options prefixed with the '-' character.

All equations for right-hand variables within the same file of equations are not duplicated. In other words, the two equations of Table 8 would be invalid.

TABLE 8

Example Invalid Set of Equations (Duplicate Variables)

$(some left-hand expression) = [IS | KeyFrontCut] ;- c@
$(some other left-hand expression) = [IS | KeyFrontCut] ;-c@

The variables of an equation may be addressed to a device's network address by using the -a option. For equation inputs, specifying a network address in an equation is useful if static addresses have been programmed for certain devices. If the address is specified, then the variable is bound to a corresponding variable of the device having the specified address. As an example, the example equation of Table 9 is responsive to device address 56 for alley left light.

TABLE 9

Addressing a Variable $([17390-a56] && [0x4dae]) * 100 = [9198]; -c@

Addresses are defined in Tables 10 and 11, which show how an eight-bit address space is split between, respectively, CAN node addresses and internal resource addresses (e.g., such as equation processor or token sequencer).

With respect to Table 10, a CAN message includes the node source and destination addresses in the CAN ID field (see e.g., FIG. 12, described later). The token(s) within the message need not include an address field, which saves bandwidth.

All devices self-assign a virtual bus address in the range of 1-120. Default and alternate addresses are derived from the device's GUID. The address algorithm is defined in file "can_address.c." Upon power-up or reset, a device broadcasts an address reservation message to reserve its default address. If a second device has already claimed the address, it responds immediately with an address in use broadcast (AIU). If the first device receives a corresponding AIU within 100 ms of address reservation, it picks the next alternate address and restarts its address assignment. If the first device does not receive the AIU, then it claims the address and broadcasts its own AIU. As a failsafe, a device will restart its address assignment if it ever receives a message from its own address. Note that all address negotiation messages use an event order of zero. Matrix virtual addresses do not convey any metadata. With 120 available addresses and 14 devices on the bus, the likelihood that one of the devices will need to choose an alternate address is 55%.

TABLE 10

CAN Bus Addresses 0-127 define CAN_BROADCAST_ADDRESS 0//broadcast address
define CAN_MIN_STANDARD_ADDRESS 1//self-assigned range 1-120
define CAN_MAX_STANDARD_ADDRESS 120//
define CAN_MIN_RESERVED_ADDRESS 121//reserved range 121-127
define CAN_MAX_RESERVED_ADDRESS 127//
define VEHICLE_BUS_ADDRESS 121//reserved: vehicle bus gateway
define PC_ADDRESS 126//reserved: PC USB-CAN connection Matrix need not employ a special method for device discovery. For example, all online devices transmit their status every 1120 ms maximum. Any device may query another discovered device for specific device information.

For Table 11, the equation processor and six token sequencers are internal features of a device and are described later. For example, internally, tokens sent from the library to the app layer include the source address of the resource that generated the token, such as the equation processor or token sequencer. Conversely, tokens received by the library from the app layer contain the destination address, which routes the token to a library resource or the CAN bus.

TABLE 11

Device Internal Address 128-255 define EQUATION_PROCESSOR_NETWORK_ADDRESS 132
define TOKEN_SEQUENCER_0_NETWORK_ADDRESS 133
define TOKEN_SEQUENCER_1_NETWORK_ADDRESS 134
define TOKEN_SEQUENCER_2_NETWORK_ADDRESS 135
define TOKEN_SEQUENCER_3_NETWORK_ADDRESS 136
define TOKEN_SEQUENCER_4_NETWORK_ADDRESS 137
define TOKEN_SEQUENCER_5_NETWORK_ADDRESS 138

When sending a single-token CAN message, the token address is copied to the ID field destination address. The sending node's address is copied to the ID field source address. Multi-token CAN message are sent for the periodic (i.e., about one-second) status updates (i.e., synchronization), in which case the ID field destination address is always 0 (broadcast).

Received CAN messages are first filtered to accept either broadcast messages or those whose destination address match the receiver node address. Messages that pass that filter copy the CAN ID field source address back to the token(s) for internal consumption.

Tables 12-14 show logic operators, delineations, and math operators.

TABLE 12

Math and Logic Operators

```
// math and logical operators, with precedence in right-hand comments
{ "!",   LexicalCodes.OperatorLogicalNot },              // 0 highest
{ "~",   LexicalCodes.OperatorBitwiseInvert },    // 0
{ "*",   LexicalCodes.OperatorMultiply },         // 1
{ "/",   LexicalCodes.OperatorDivide },           // 1
{ "%",   LexicalCodes.OperatorModulus },          // 1
{ "+",   LexicalCodes.OperatorAdd },              // 2
{ "-",   LexicalCodes.OperatorSubtract },         // 2
{ "<<",  LexicalCodes.OperatorShiftLeft },        // 3
{ ">>",  LexicalCodes.OperatorShiftRight },       // 3
{ "<",   LexicalCodes.OperatorIsLessThan },       // 4
{ "<=",  LexicalCodes.OperatorIsLessThanOrEqual },    // 4
{ ">",   LexicalCodes.OperatorIsGreaterThan },    // 4
{ ">=",  LexicalCodes.OperatorIsGreaterThanOrEqual }, // 4
{ "==",  LexicalCodes.OperatorIsEqual },          // 5
{ "!=",  LexicalCodes.OperatorIsNotEqual },       // 5
{ "&",   LexicalCodes.OperatorBitwiseAnd },       // 6
{ "^",   LexicalCodes.OperatorBitwiseXor },       // 7
{ "|",   LexicalCodes.OperatorBitwiseOr },        // 8
{ "&&",  LexicalCodes.OperatorLogicalAnd },       // 9
{ "||",  LexicalCodes.OperatorLogicalOr },        // 10
{ "?",   LexicalCodes.OperatorConditionalQuestion },   // 11
{ ":",   LexicalCodes.OperatorConditionalSeparator },  // 11 lowest
{ "(",   LexicalCodes.OperatorOpenParentheses },
{ ")",   LexicalCodes.OperatorCloseParentheses },
```

TABLE 13

Delineators

```
// equation and token delineation
{ "$",   LexicalCodes.EquationStart },
{ "$$",  LexicalCodes.PriorityEquationStart },
{ "+$",  LexicalCodes.SuccessiveEquationStart },
{ ";",   LexicalCodes.EquationEnd },
{ "=",   LexicalCodes.Equals },
{ "=>",  LexicalCodes.Lambda },
{ "[",   LexicalCodes.TokenKey },
{ "]",   LexicalCodes.TokenKeyClose },
```

TABLE 14

Directives

```
// preprocessor directives
{ "include",  LexicalCodes.PpInclude },
{ "define",   LexicalCodes.PpDefine },
{ "undef",    LexicalCodes.PpUndef },
{ "ifdef",    LexicalCodes.PpIfdef },
{ "ifndef",   LexicalCodes.PpIfndef },
{ "if",       LexicalCodes.PpIf },
{ "elif",     LexicalCodes.PpElif },
{ "else",     LexicalCodes.PpElse },
{ "endif",    LexicalCodes.PpEndif },
```

FIG. 6 builds on the previous green-wire example by providing a dimming example 178 employing additional syntax. A SIB microcontroller 180 has an equation processor that evaluates SIB equations that include as operands local "wire" variables called pAlleyLeftInput and pNightDimInput. These operands are used to establish values for global input status variables called KeyLight_AlleyLeft and KeyModeNight, which are communicated over CAN bus 12. Likewise, a lightbar microcontroller 184 has an equation processor that evaluates BAR equations. The BAR equations include a ternary operator (shown in Table 12 as "Conditional" question and separator) that is evaluated to set intensity of a local "light" variable called pAlleyLeftOutput, which ultimately controls alley left light 92. For example, pAlleyLeftOutput is set to 30 (i.e., 30% of max light intensity) if KeyLight_AlleyLeft and KeyModeNight variables are "1"; 100% of max if the KeyLight_AlleyLeft variable is "1" and the KeyModeNight variable is "0"; or 0 (off) if the KeyLight_AlleyLeft variable is "0" (in which case it does not matter whether the KeyModeNight variable is "1" or "0").

Figure 7:
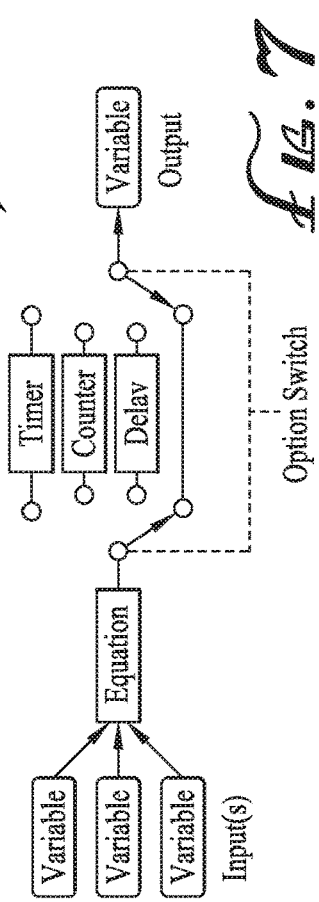
FIG. 7 is a block diagram showing how timing options control the timing of when tokens are output.

FIG. 7 shows an example block diagram representing how some embodiments of equations include a time-logic unit 190, which affords an ability to implement timing features, such as a "door ajar" timer. These features are implemented via output options. Thus, output options allow a designer to specify the time-logic unit configuration, and whether an equation result change will be shared with the local application and system network. The output option @, for example, specifies that the local application and system network will be notified of an equation result change since global input or output variable changes are broadcast over the network. There are also additional situations where a designer may elect to not send a token, such as if the result changes by some value that is below a threshold. Accordingly, several output options are set forth in Table 15.

TABLE 15

Token Output Options

-c@ Send a token on equation result change.
-r@ Send a token on equation result rising >=1.
-f@ Send a token on equation result falling >=1.
-rv@n Send a token on equation result rising >=n.
-fv@n Send a token on equation result falling >=n.

Although the last two system event options include rising and falling by a specified amount, another solution for rapidly-changing sensors is to use feedback hysteresis in the equation itself. Sensor input event messages may also be limited to prevent consuming too much bus bandwidth.

Tables 16-26 show time and logic functions that can be specified in the output options. Please note that one time-logic option may be followed by one (optional) system event option per equation, with the exception that -rskt, -fskt, -rc and -fc may also be used as secondary time-logic options in the same equation.

The first one, the activity monitor, is unique because it tracks how often a token arrives. Since all devices output a status once per second, the activity monitor can be used to detect the presence of another device on the bus. The output variable of the activity monitor is a Boolean value, true when then token is received at least every n milliseconds.

TABLE 16

-amn Activity Monitor $[1234] = [4567]; -am2000

The next set of special functions are the up-counters with rollover. They count when the left-hand expression is evaluated to change from zero to non-zero (rising edge), or vice versa (falling edge) depending on the type. The toggles are up-counters that roll over at the value two.

TABLE 17

-rctrn Rising-Edge Up-Counter $[12]&[23]=[4567];-rctr4 // counts 0, 1, 2, 3, 0, 1, 2, 3, etc.

TABLE 18

-fctrn Falling-Edge Up-Counter $[12]&[23]=[4567];-fctr4 // counts 0, 1, 2, 3, 0, 1, 2, 3, etc.

TABLE 19

-rt Rising-Edge Toggle $[12]&[23]=[4567];-rt // counts 0, 1, 0, 1, etc.

TABLE 20

-ft Falling-Edge Toggle $[12]&[23]=[4567];-rt // counts 0, 1, 0, 1, etc.

The skip-increment functions work with the up-counters, forcing them to skip the next increment that would have occurred when their left-hand expression is evaluated to change from zero to non-zero (rising edge), or vice versa (falling edge) depending on the type. The skip-increment is activated when its own left-hand expression is evaluated to change from zero to non-zero (rising edge), or vice versa (falling edge) depending on the type.

TABLE 21

-rskt[n] Rising-Edge Skip Increment $[32]=[7654];-rskt[4567] // where [4567] is the up-ctr

TABLE 22

-fskt[n] Falling-Edge Skip Increment $[32]=[7654];-fskt[4567]

The variable clear functions clear a variable when its left-hand expression is evaluated to change from zero to non-zero (rising edge), or vice versa (falling edge) depending on the type.

TABLE 23

-rc[n] Rising-Edge Clear $[32]=[7654];-rc[4567] //where [4567] is variable to clear

TABLE 24

-fc[n] Falling-Edge Clear $[32]=[7654];-fc[4567]

The last two special functions are an equation input-to-output delay. The output variable of the delay is a Boolean value. Rising edge delay is a Boolean output that changes from 0 to 1 n milliseconds after the left-hand evaluation changes from zero to non-zero. When the left-hand evaluation changes from non-zero back to zero, the output changes from 1 to 0 immediately. Likewise, falling edge delay is a Boolean output that changes from 1 to 0 n milliseconds after the left-hand evaluation changes from non-zero to zero. When the left-hand evaluation changes from zero back to non-zero, the output changes from 0 to 1 immediately.

TABLE 25

-rdn Rising-Edge Delay $[12]&[23]=[4567];-rd400

TABLE 26

-fdn Falling-Edge Delay $[12]&[23]=[4567];-fd400

Lastly in terms of syntax, there are separate enumerations for patterns of light, sound, or both (including steady and cut patterns), which are called output sequences. Output sequences are a set of flashing lights, warning sounds, or both, and include a steady pattern (a set of lights that remain illuminated) and cut pattern (a set of lights that remain unilluminated). Although a steady or a cut pattern might seem static (i.e., not a repeating flash or sound pattern), tokens are continuously generated in the actuation of lights and sirens used to produce these patterns, and these tokens are sent from an internal software function called a token sequencer (or simply, a sequencer). It is called a sequencer because the software function generates a predetermined sequence of tokens that establish the desired output sequence. Additional information on sequencers is provided after the data structures for output sequences are described.

Table 27 shows how output sequences are identified by enumerations divided into regions for lightbars, Safety Director, and so on. Enumeration zero (0) is reserved to stop a token sequencer. The first 25% of each region is reserved for nondescript indexed patterns that are typically created by a GUI. A file, e.g., "patterns.h," describes the detailed working regions and sub-regions. Output sequence enumerations are conveyed in the value fields of certain global variables. Like the previously described global variables, some output sequences are named, whereas others are indexed. Those which have been named are typically industry-standard regulatory patterns or patterns common in ESG circles. Any non-named output sequences, including user-defined ones, use the indexed region. The output sequence enumerations are 13-bit, in the range 1 through 8191. Enumeration zero is pattern stop.

TABLE 27

Pattern Regions

| Region | Start | Size |
|---|---|---|
| Indexed Lightbar | 1 | 1,023 |
| Named Lightbar | 1,024 | 3,072 |
| Indexed Safety Dir. | 4,096 | 128 |
| Named Safety Dir. | 4,224 | 384 |
| Indexed Sound | 4,608 | 128 |
| Named Sound | 4,736 | 384 |
| Reserved | 5,120 | 2,560 |
| Misc. Indexed | 7,680 | 128 |
| Misc. Named | 7,808 | 384 |

FIGS. 8 and 9 show that patterns of an output sequence are defined by tables of numbers. In general, all pattern tables start with a 16-bit value (not shown) indicating the number of patterns in the table.

FIG. 8 shows a standard pattern table format, which is read by a sequencer to generate a sequence of one or more variables to actuate lights and sounds. A pattern start field indicates the enumeration for an output sequence and the number of times the pattern repeats. If the value of "repeats" is zero, then steps and output sequence are repeated until otherwise stopped. The pattern start field is followed by an all-off, or a pattern step with the same function. Pattern step tokens may be variables of 0-4 bytes, and may be compressed using a token codec (shown in FIG. 10).

A pattern is terminated asynchronously, at a time when outputs may be on. The "All-Off" table entry informs the sequencer which outputs participated in the pattern to turn them all off. The "All-Off" entry is not a pattern step. To save memory, the "All-Off" entry may be omitted, provided that the first pattern step turns off all the outputs which participate in the pattern.

FIG. 9 shows the single-variable pattern table format, which efficiently sequences light engine dictionary keys and LED Matrix keys. The LED Matrix is an electronic billboard and each sequenced token is used to communicate things such as "scroll message 4 left" or the like. Dictionary keys are used for communications with individual light heads (engines) for a type of light bar having a secondary CAN bus, as described in International Patent Application No. PCT/US2017/037506, filed Jun. 14, 2017, and naming Code 3, Inc. as applicant. For conserving bandwidth of the secondary CAN bus, each light head is preprogrammed with its portion of the patterns for which it participates, using a dictionary of key-value pairs. The token sequencer, therefore, outputs a dictionary key per pattern step, as opposed to a set of tokens to control individual outputs. The 0xx pattern enumeration prefix of FIG. 9 indicates the variable enumeration to sequence.

Previously, the green-wire example demonstrated how to turn on individual lights. Activating sequencers is similar. Sequencers have two properties that are set: the intensity and the output sequencer enumeration. The intensity is in the range 0-100 and scales the illumination output for dimming in a night mode.

The C library includes six sequencers that all share the same pattern table, according to one embodiment. This allows a user to run six separate output sequences at the same time, each with its own output priority. Table 28 is an example of a lightbar using the SIB input 24 to control a sequencer.

TABLE 28

Sequencer Equation Example

```
// sequencer indices are zero-based
#define SEQUENCER_1_INDEX 0
#define SEQUENCER_2_INDEX 1
// . . . etc. for more sequencers
// run sequencer 2
// result value is ((intensity << 16) | enumeration)
$( [IS | 498] ? Pattern_Lightbar_Double_75_FPM : Pattern_Stop)
//
enumeration | ( [IS | KeyModeNight] ? 30 : 100) << 16
   // intensity =
[OS | KeyIndexedSequencer + SEQUENCER_2_INDEX];-c@
```

The first line of the equation of Table 28 essentially means that if the SIB input 24 is set, then the Double 75 FPM pattern is run, or else the sequencer is stopped. Note that when the Pattern_Stop (zero) enumeration is sent to a sequencer, it sets all the lights to their default pattern value (normally zero), and then stops.

The second line means that if dimming is enabled, the sequencer is set to 30% brightness, or else it is set to 100% brightness. The KeyModeNight is the dim input status from pin 12 on the SIB. Note that the ternary result is shifted to the third most significant byte. Equation values are treated as signed 32-bit.

The third line is the result, with output status KeyIndexedSequencer plus the sequencer index. The option -c@ causes the equation to send a token to the sequencer when the equation output changes. Since [OS|KeyIndexedSequencer] is a global output status, a token is also broadcast on the CAN bus.

Matrix supports both input and output priorities. To understand input priorities, an example is provided in Table 29, which assumes that green, brown, and red wires are each assigned to a different pattern. Accordingly, a lightbar equation in Table 29 provides the green wire the highest input priority for sequencer 2.

TABLE 29

Resource Priority Examples

```
// un-assigned indexed SIB inputs, their indices do not set priority
#define GREEN_WIRE 493
#define RED_WIRE 494
#define BROWN_WIRE 495
#define BLUE_WIRE 496
#define ORANGE_WIRE 497
#define YELLOW_WIRE 498
// sequencer indices are zero-based
#define SEQUENCER_1_INDEX 0
#define SEQUENCER_2_INDEX 1
// etc. for more sequencers
// run sequencer 2
$([IS | GREEN_WIRE] ? Pattern_Lightbar_Double_75_FPM // highest priority
: [IS | RED_WIRE] ? Pattern_Lightbar_Reg_65_Single_120_FPM // 2nd highest
: [IS | BROWN_WIRE] ? Pattern_Lightbar_Reg_65_Double_120_FPM // 3rd highest
: Pattern_Stop)
|([IS | KeyModeNight] ? 30 : 100) << 16 =                  // intensity
[OS | KeyIndexedSequencer + SEQUENCER_2_INDEX];-c@         // result
// run sequencer 3
$( [IS | BLUE_WIRE] ? Pattern_Lightbar_Double_150_FPM // highest priority
: [IS | ORANGE_WIRE] ? Pattern_Lightbar_Reg_65_Single_150_FPM // 2nd highest
: [IS | YELLOW_WIRE] ? Pattern_Lightbar_Reg_65_Double_150_FPM // 3rd highest
: Pattern_Stop)
|([IS | KeyModeNight] ? 30 : 100) << 16 =                  // intensity
[OS | KeyIndexedSequencer + SEQUENCER_3_INDEX];-c@         // result
```

In the above sequencer 2 equation, the first ternary has the highest input priority, and therefore the green wire wins. Skilled persons will appreciate that there may be other approaches to setting input priorities.

The priority equations in Table 29 used seven operands and seven operators. When the equation processor runs, it uses a calculator stack of opcodes and operands for each equation. Each time an equation is evaluated, the stacks are reset. Since the devices are typically small microcontrollers, their memory is constrained, and their default stack depth is limited to 20 operands and 20 operators. The DevTool bytecode compiler reports the maximum calculator stack depth used for any one equation. When the stack depth for an equation exceeds the available stack, a developer may instead use intermediate local variables to break up the equation into several sub-equations.

To understand output priorities, consider that when two output sequences attempt to use the same output, such as a LED, the higher-priority output sequencer controls the LED until its output sequence is stopped. When the higher-priority output sequencer is stopped, the lower-priority output sequencer can take over if it is still running. Output priorities have a range of 1-6, with six being the highest.

Outputs are prioritized with one of two methods, depending on the device. Devices using the standard pattern tables (FIG. 8) use the sequencer index to know the priority (e.g., the local sequencer address). Using this method, in Table 29 above, sequencer 3 has output priority over sequencer 2. Alternatively, devices using the single-token pattern tables with output dictionaries (FIG. 9) embed the output priority in the dictionaries. So, in Table 29 above, sequencer 3 does not have output priority over sequencer 2. The output priority just depends on the pattern being sequenced. Thus, for either method there is no priority embedded in the pattern table. All sequencers share the same pattern table.

FIG. 10 shows an example of modules of a C99 library 220 provided for Matrix implementation. Library 220 includes the following modules: a protocol message composer with CAN frame output buffer 222; a protocol message decomposer with CAN frame input buffer 224; a token compressor/decompressor (codec) 230 for messages and light patterns; an FTP server and client 232; a flash drive file system 234; an equation processor 236; and six token pattern sequencers 240 with the ability to sequence any kind of token, including nested patterns.

Library 220 is loosely coupled to a device's application 244 via a constant table of method callbacks for, e.g., software access of a CAN port 246, and it need not have direct interface to device hardware. Application 244 first resets library 220, and then clocks library 220 with the current system time in milliseconds. Library 220 is compatible with cooperative multitasking. It is also compatible with preemptive multitasking if each clock call runs to completion. It should be clocked as often as possible to ensure smooth pattern sequencing, and as often as necessary to ensure that received CAN frames are processed before filling the receiver's asynchronous buffer. Library 220 uses a stack that is at least 512 bytes deep, according to one embodiment.

Equation processor 236 complies with the equation specifications described previously, and it continuously updates all equation outputs. In addition to the equation-specified token output options, equation processor 236 synchronizes public variables, as described previously, approximately once per second. Equation processor 236 processes behavioral equations obtained from a file named "equation.btc" stored in flash drive volume zero 248.

Codec 230 compresses and decompresses message tokens. Token compression is desirable for the network traffic, and is desirable for minimizing token pattern code space. Codec 230 is used by token sequencers 240 in case the token pattern tables were compressed at compile time.

Each sequencer of token sequencers 240 runs independently, and all share a common pattern file named "patterns.tbl" located on flash drive volume zero 248. Designers have two methods to control output priorities, such that one running pattern may have priority over the same outputs used by another running pattern. First, for standard pattern tables, the application can infer the pattern priority from the sequencer address. Thus sequencer 0 has the lowest priority, and sequencer 5 has the highest. The sequencer will set the TF_DEFAULT_STATE in the token flags to reset the priority when the pattern is turned off. The application is responsible for tracking the priorities and implementing a failsafe timer should an error occur when a priority did not get reset (however unlikely). Second, for single-variable pattern tables, the priorities are embedded in the dictionary(ies). Thus the sequencer address is not associated with the priority, and any sequencer can run any priority of pattern.

FTP server and client 232 facilitates a file transfer protocol optimized for CAN bus 12 using RPC protocols. FTP server and client 232 are both capable of getting file info, reading, and writing named files in device flash memory. The client portion allows a smart controller to read the files of a lightbar, providing the capability for an adaptable field control GUI. During the time when an FTP server or client 232 is connected, the CAN receiver of message decomposer 224 filters only those messages related to the file transfer, plus events. Both the client and server 232 have a no-response timeout, and the decomposer filter has a timeout as well. The FTP server optionally routes file read requests through the application, thus providing a means to make a remote procedure call. Application 244 may handle the call by examining the file name and providing the requested data, or return null and let the FTP server look for the data in the file system.

Flash drive file system 234 includes up to three separate drive volumes including volume zero 248 and volume one 250. System files such as behavioral equation files and pattern files are stored in application execution memory region volume zero 248. Flash drive file system 234 makes API calls back into application 244 for 234 reads and writes, and to get the volume for a given file name. File system 234 attempts to level-wear the flash memory. Files that are rewritten are marked as erased, and the flash continues to fill top-down and bottom-up. When the flash is full, the file system defragments the volume and erases unused space. An application designer may wish to automatically cache flash writes for a few hundred milliseconds, or until a sector boundary is crossed. This caching would prevent unneeded flash wear during defragmentation.

Matrix uses a cryptographic server access code for FTP and RPC transactions. A confidential algorithm is used to create the access code that is based on each device's GUID; thus no two device access keys are the same. The client may read the device file's information (as opposed to the full file) to acquire the device's GUID without first needing the access code. The access code is hashed with additional fixed keys for critical system commands such as KeyRequestSystemReboot, as defined in "tokens.h." The server access code is unique to every device with a unique GUID, thus making an attack on a group of devices more difficult.

Protocol message composer 222 and decomposer 224 each have separate buffers. Message composer 222 has a 40-frame buffer, and decomposer 224 has a 20-frame asynchronous buffer and 72-frame synchronous buffer. These buffers may be increased as needed. Decomposer 224 sorts out-of-order packets and interleaved packet streams from multiple sources, and reproduces coherent messages. Decomposer 224 then routes the messages to FTP server or client 232 or codec 230.

Composer 222 and decomposer 224 cooperate to manage the system event index that is used (e.g., incremented) to ensure that the most recent input event prevails when there are conflicting messages. For instance, the first data byte off all Matrix messages is an 8-bit event order variable. All devices keep a local copy of this variable. The event order is incremented prior to the broadcast of a global input status change event. Upon receiving a Matrix message, all devices update their local copy when the incoming event order is newer and non-zero. The event order is used to filter certain messages. Input or output status events, pattern sync, FTP requests and responses, and messages with event order zero are always accepted. All other message types must have the same or newer event order as the local copy to be accepted. This ensures that events will not be contradicted by stale status messages that were previously queued for transmission. Upon reset or boot, a device will set the local copy of the event order to zero. The Matrix C99 library manages the event order variable and related filtering of messages.

FIG. 11 shows different types of messages available in Matrix. Matrix nodes most frequently use one-to-many broadcasts 260 and sometimes use one-to-one messages 266. For Ethernet and Wi-Fi transports, Matrix one-to-many and one-to-one protocols use UDP and TCP, respectively.

One-to-many messages 260 include event broadcasts 270, periodic status broadcasts 274, and device commands 276.

For event broadcasts 270, all devices immediately broadcast a change in any of these applicable states: overall state (system good, or error code); discrete wire inputs; user controls; sensors, including those for sensing hardware error conditions; audio output devices; individually-controlled lights, such as takedown; message displays; and pattern sequencers (sequencer state as opposed to sequenced items).

For periodic status broadcasts 274, all devices periodically broadcast all of the applicable states from the event broadcast list above. In order to disperse broadcast traffic, the broadcast rate formula for a device is as follows:

$$1/(1 \text{ s} + (\text{bus address} - 60) * 1 \text{ ms})$$

Device commands 276 provide direct unconditional control of a device's components, such as message signs, sirens, individual lights, token pattern sequencers and indicators. Device commands are useful for production and test, and for third party OEMs.

One-to-one messages 266 are used to send a command 280 to a single device and to respond to a query for specific device information. One-to-one connections 282 are also used to transfer files to and from the system devices.

FIG. 12 shows a CAN ID field 286. A data field (not shown) includes the previously described event index and key-value (token) information.

HazCAN Code 0x0C is used for single-frame messages. Code 0x0D is used for the frames of multi-frame messages, except for the last such frame, which uses 0x0E.

The sender and destination address are seven bits to encompass addresses 0-127. Normal self-assigned addresses are 1-120. Broadcast destination address is zero. Sender address zero is used during address negotiation. Fixed dedicated addresses 121-127 are defined in the file "lib_interface.h."

The E Flag bit 12 is set to indicate a global input or output status event frame. Such events are single-frame messages with HazCAN code 0x0C, and thus have priority over other Matrix messages during CAN frame arbitration. The E flag informs the software receiver message re-constructor that the message has priority.

The frame index includes a five-bit rollover up-counter that informs the software receiver message re-constructor of the packet sequence. There is also a message checksum in the form of a CRC-16-IBM reversed checksum as the last two data bytes of all multi-frame messages. Any multi-frame message with an invalid checksum is ignored.

According to one embodiment, all ESG devices on a CAN bus transmit compressed token messages, and are capable of receiving both compressed and uncompressed messages. Compression helps address bus traffic congestion arising from the relatively low bitrates and small payload sizes of the CAN transport. For like groups of inputs or outputs, the ESG key database is preloaded with common sequential assignments. A binary repeat and an analog repeat token both work by specifying a base key and a number of repeats, and then incrementing the key for each subsequent value symbol. Thus, to achieve optimal compression, sequential keys are to be used whenever possible. The compression algorithm presorts the keys if necessary.

A binary repeat uses binary flags to confer either a zero or a common value to the resulting uncompressed token. Note that the common value may be any type of value; a binary value or 1-4 byte value based on the token key.

An analog repeat applies individual scaler values to a series of sequential keys. This is useful for certain lighting pattern sequences and still provides good key compression. System designers are strongly encouraged to keep compression in mind when adding new key ranges to the database.

The amount of payload space used to express a token value is dependent on the token key. Matrix provides values of 0-4 bytes. During normal operation, assuming a data rate of 125 kbps with extended frame format, and 14 live nodes each sending 4-packet status messages once per second, basic bus utilization is 5.7%. The standard API for Matrix performs the compression and decompression, alleviating designers from implementation details.

FIG. 13 shows a computer device (e.g., a configuration workstation) 288 in communication with lightbar 90. Computer device 288—which may be a laptop, portable smart device (e.g., tablet), or any other programmable electronic user equipment device—includes a display panel 290 that presents to a user a GUI 292 shown in FIGS. 14-19, which provides configuration menus for different inputs and outputs of devices communicatively coupled to CAN bus 12. The term GUI is also used as a shorthand for referring to underlying software algorithms that, e.g., automatically generate behavioral equations based on a desired configuration established with, and presented by, GUI 292.

FIG. 13 also shows two arrangements for connecting computer device 288 to CAN bus 12. According to a first embodiment, computer device 288 connects to SIB 68 (or other Matrix node) through a USB-to-CAN interface 296. According to a second embodiment, computer device 288 connects directly to array controller 74 through a serial connection 298. Skilled persons will also appreciate that wireless connectivity (e.g., Bluetooth® personal area networking) may be used between computer device 288 and CAN nodes, in some other embodiments.

Through the use of GUI 292, which is referred to as the Matrix Configurator, computer device 288 facilitates user-initiated (i.e., dragging and dropping) configuration of system behaviors established by mapping desired actions (i.e., outputs) onto one or more selected inputs (or vice versa, in other embodiments), automatically generating corresponding behavioral equations, optionally compiling them to bytecode, and updating the appropriate configuration files (e.g., bytecode files) to the network devices.

Figure 14:
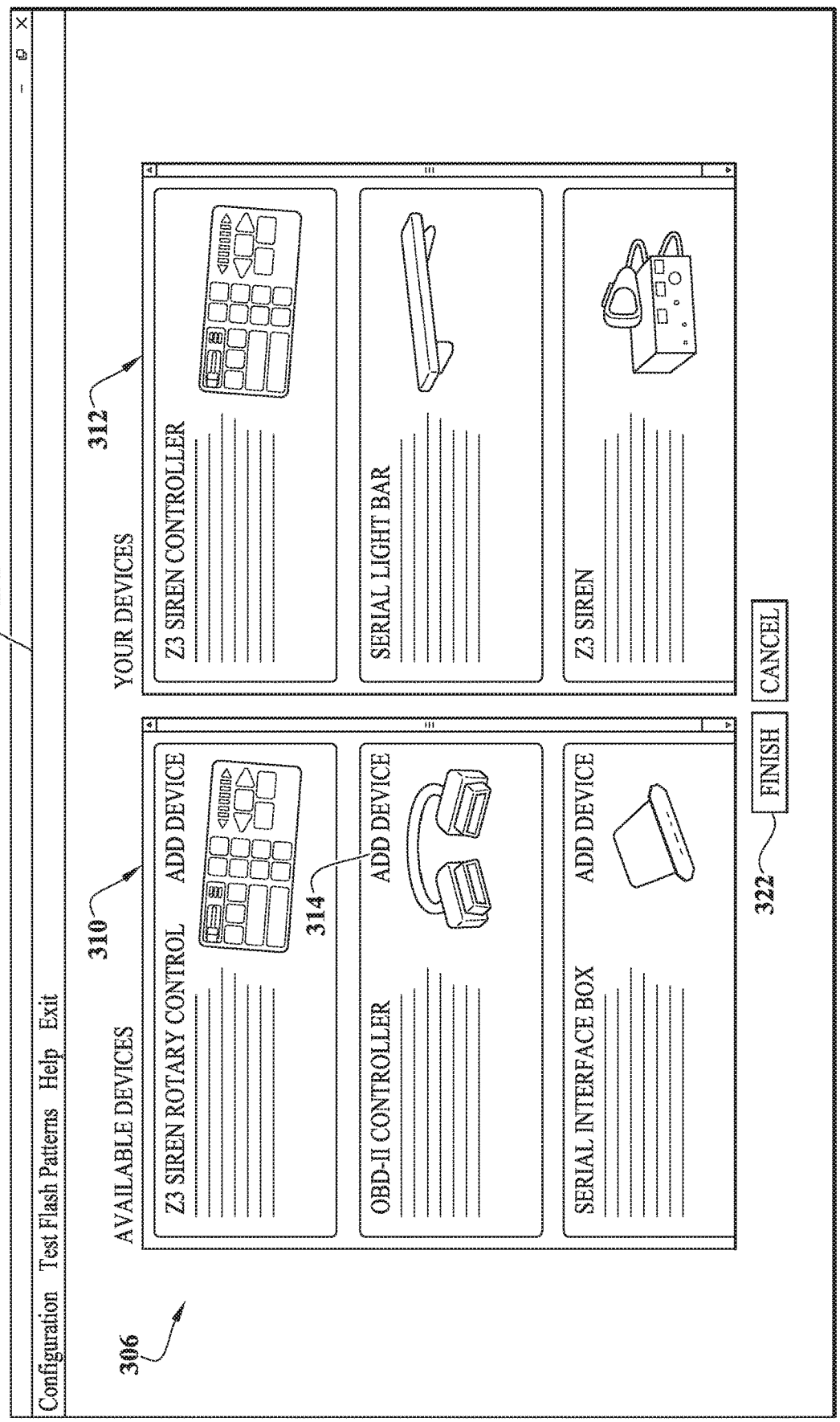

Initially, FIG. 14 shows a device selection menu 306. On a left side of device selection menu 306 is a list 310 of devices available for a user to add to an overall system configuration. On a right side of device selection menu 306 is a list 312 of devices that the user has added or established a communication connection to (devices detected by) computer device 288. GUI 292 offers an option to configure any device irrespective of whether it is detected by computer device 288. A user may select "add device" 314 to add a virtual device of his/her choice to list 312. The user can then manage such virtual devices in the same way as those that are physically connected to computer device 288. The ability to configure any Matrix-compatible device without having a virtual device connected allows for a user to pre-configure devices before they arrive and pre-examine device behaviors and combinations. Moreover, an emulation mode allows a customer to view how selected devices act without the device being present. In an emulation mode, users click on an input, e.g., any set of buttons 320 (FIGS. 15-18) representing wired inputs of SIB 68, to observe a virtual presentation showing the behavior of configured output devices (i.e., lightbars and sirens).

Once devices are selected and the user clicks a "finish" button 322, newly added devices along with physically connected devices are shown on a main configuration menu 326 (FIGS. 15-19). Configuration menu 326 includes three main sections for facilitating the process of configuring a device: selecting available device input(s), selecting device action(s), and reviewing and propagating the results.

An Input Devices column 328 presents input devices previously included in list 312 (FIG. 14) that a user seeks to configure. Accordingly, Input Devices column 328 allows users to select certain inputs, i.e., Z3 siren pushbutton controller buttons, sliders, and input wires that will have associated actions. An Actions column 332 lists the available actions to be performed in response to selected inputs. A Configuration column 336 shows the selected inputs and allows a user to drag actions from Actions column 332 to establish the desired behaviors.

Also shown in Input Devices column 328 is a collapsed menu that may be optionally expanded for configuring certain system-wide states and conditions. For example, these so-called global input states and conditions include vehicle alert levels, which may be separately configured with actions (just like any other selected inputs), but then act as scripts of one or more actions assignable to selected inputs, e.g., a wire input. For example a so-called Alert Level 3 is configured with multiple discrete actions, such as a siren and a flash pattern, and then Alert Level 3 is available in Actions column 332 for a user to drag and drop in Configuration column 336 (see, e.g., FIG. 19) for configuring a selected input with the group of actions previously associated with this Alert Level 3.

Figure 17:
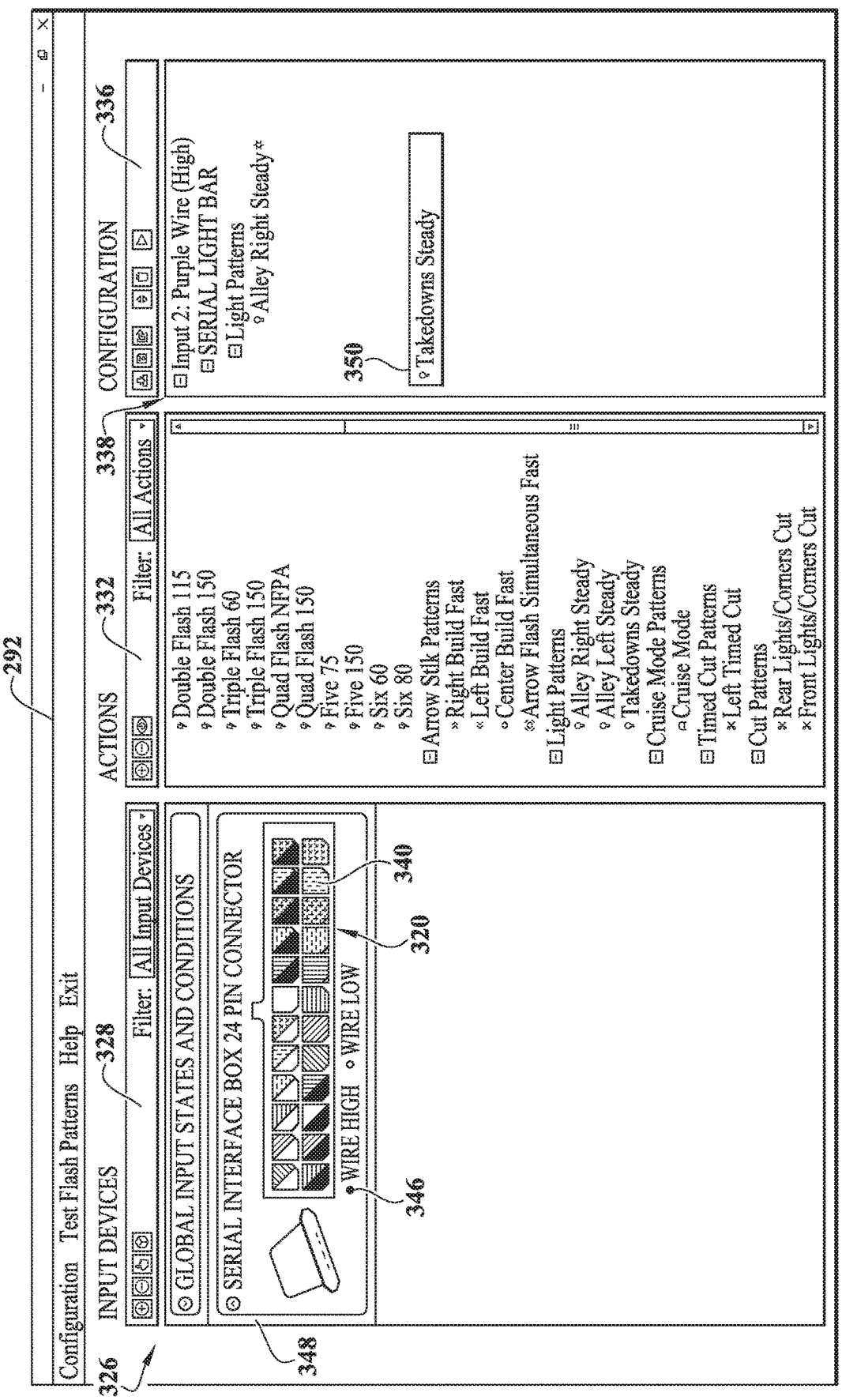
Figure 18:
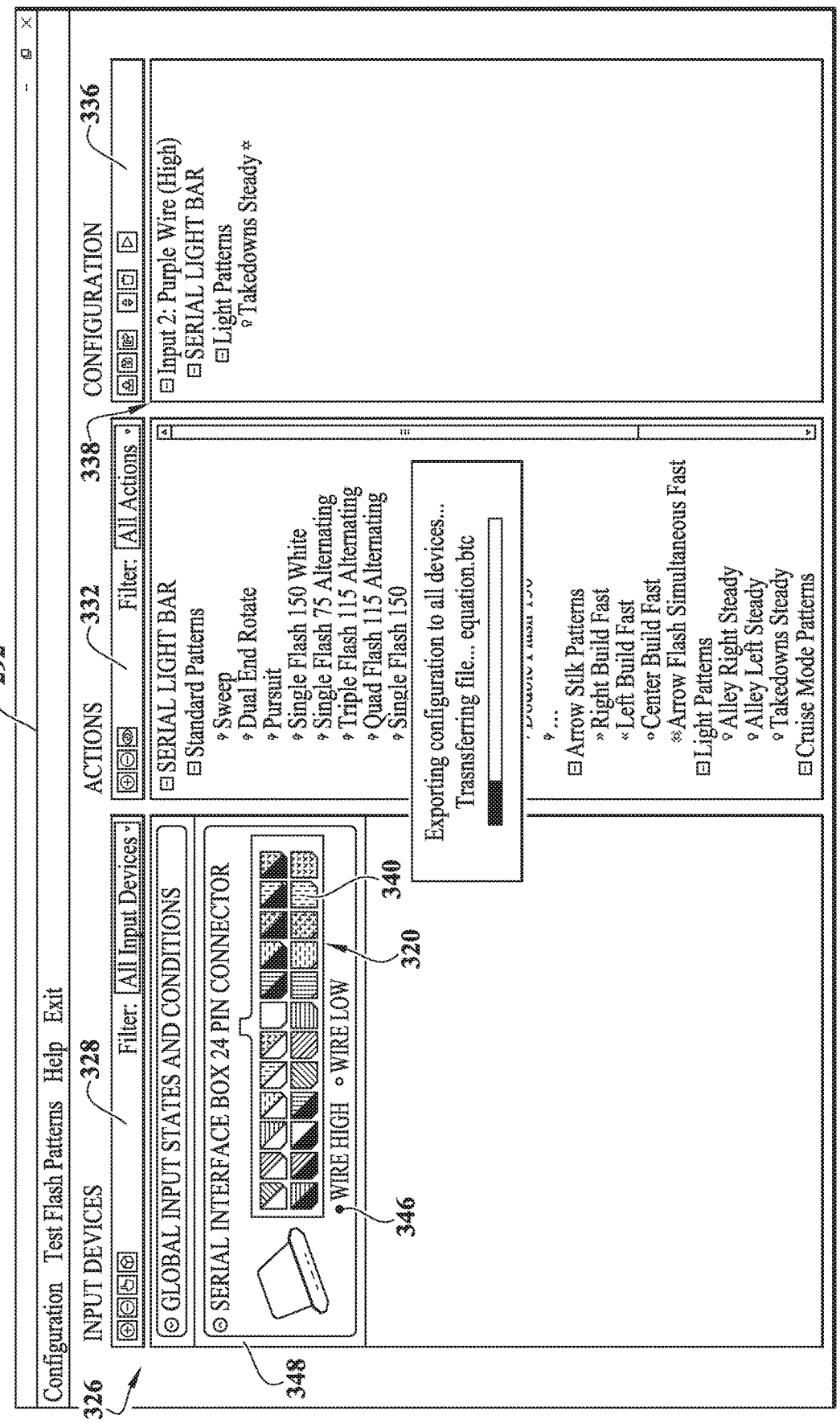

From Input Devices column 328, users have the ability to select a single input or multiple inputs to configure as a group. Configuration column 336 of FIG. 15 shows examples of both single ("Input 9 . . . ") and multiple input ("Input 9 . . . . Input 10") configuration. For purposes of conciseness and clarity, however, FIGS. 16-18 show a slightly simpler example of how a user configures a single input ("Input 2 . . . ") by clicking on its visual representation.

In Configuration column 336, a hierarchical tree menu 338 describes that a "High" voltage level of a purple wire of SIB 68 is the selected input to be configured because a user previously selected a purple box 340 and "Wire High" radio button 346 from a SIB input selection menu 348 presented in Input Devices column 328. Hierarchical tree menu 338 shows that the currently configured action for the selected input is that, when a purple wire has a high voltage, lightbar 90 actuates its alley left light 92. In this example, SIB 68 does not have its equation file updated because it is not an output devices have equation changes. The initial behavioral equation to modify is as follows:

TABLE 30

Lightbar Equations $([PurpleWire\_2]?1:0)=[pAlleyRight]$

To change this configuration, FIG. 17 shows that a user drags a different action ("Takedowns Steady") 350 from Actions column 332 and drops it anywhere in hierarchical tree menu 338. GUI 292 is intelligent such that the user is not required to drop the input/action combination at a specific place in Configuration column 336. The user simply drops the desired action anywhere and the underlying software locates and places the action under a correct branch of hierarchical tree menu 338. In other words, GUI 292 automatically adds or replaces the newly dropped action for the user, which alleviates the user from having to know where the action should reside within hierarchical tree menu 338. In terms of ease of use in configuring a device via the drag-and-drop input/action experience, once a user drags and drops his or her first input/action combination, he or she intuitively understands how to configure any Matrix-compatible device, without the need for lengthy training sessions.

After the new action is dropped, hierarchical tree menu 338 is updated, as shown in FIG. 18, to indicate that the new configuration will now actuate a takedown light (i.e., a forward-facing spotlight in a center of a lightbar). The user may now initiate an export of the new configuration. The modified behavioral equation is as follows:

TABLE 31

Lightbar Equations $([PurpleWire\_2]?1:0) = [pTakeDown]$

Preparatory to export, GUI 292 generates behavioral equation files mapping selected inputs and outputs to global variables, as described previously. The files are optionally compiled for target devices' flash memory. Logic used to generate behavioral equations and configure each device using GUI 292 is located within a software plugin for each particular device. This separates a device's configuration logic from its main software application. As new devices are launched, a device plugin is downloaded to a customer's configuration software.

A standard .Net C# communications stack is provided for communications between GUI 292 and Matrix C99 library 220 (FIG. 10). The communications stack implements the aforementioned FTP client protocol and USB-to-CAN interface. The communications stack also provides an API for reading and writing files to devices at known addresses. The stack also provides a list of online devices and their CAN addresses.

Figure 19:
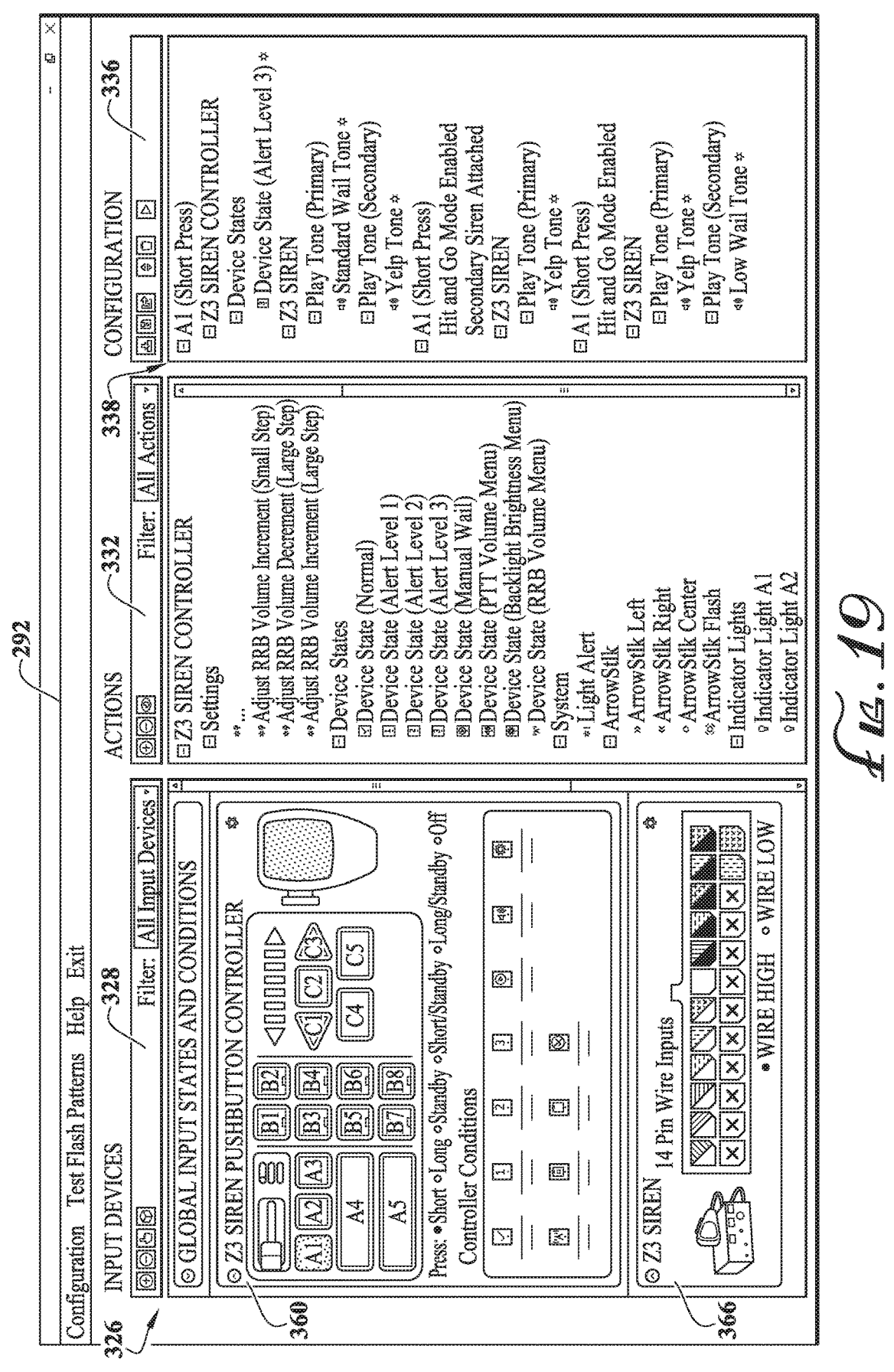

FIG. 19 is final example showing two input device menus including a Z3 Siren Pushbutton Controller menu 360 (functionally akin to keypad 80, FIG. 3) and a z3 Siren menu 366 (functionally akin to SIB/Siren 68, FIG. 3). Prior attempts to configure different devices relied on separate applications. For example, to configure a siren, the user downloaded and installed Z3 Siren configuration software. And to configure a keypad, the user downloaded and installed a separate program. Learning and maintaining multiple applications for each device was inefficient since each piece of software was completely unique. With the Matrix Configurator software, the user is presented with one central application that uses the drag-and-drop method to configure any current and future Matrix-compatible device, concurrently and in an intuitive manner.

In light of this disclosure, skilled persons will appreciate that many changes may be made to the details of the above-described embodiments without departing from the underlying principles of the invention. The scope of the present invention should, therefore, be determined only by the following claims.

The invention claimed is:

1. A controller area network (CAN) node for communicating through a first CAN bus as a member of a set of communicatively coupled CAN nodes in an auxiliary network, the set of communicatively coupled CAN nodes configured to act as a vehicle-carried warning system when deployed in an automobile, the automobile having a second CAN bus for its QEM network that is independent from the auxiliary network, the vehicle-carried warning system including an output device and an input device, the output device configured to change an output status representing a state of a light or a siren for the vehicle-carried warning system, the input device configured to change an input status in response to a state of a user or an automobile input, each member of the set having, and configured to monitor status of, one or both input and output devices for establishing the vehicle-carried warning system, the CAN node comprising:
a non-transitory machine-readable storage device configured to store machine-readable instructions representing a behavioral equation that defines a configurable relationship between a global variable and a device status of the CAN node, the global variable acting as a shared data structure maintained by the set of communicatively coupled CAN nodes for representing one of the input status or the output status; and
processor circuitry that, in response to execution of the machine-readable instructions, evaluates the behavioral equation and generates a CAN message in response to an event changing the input status associated with the input device, the CAN message configured to be broadcast over the first CAN bus to update the output status associated to the output device, the CAN message including a value obtained from evaluation of the behavioral equation and a key identifying the global variable to be updated by other members of the set of communicatively coupled CAN nodes.

2. The CAN node of claim 1, in which the processor circuitry is configured to process an updated version of the behavioral equation and thereby modify the configurable relationship between the global variable and the device status.

3. The CAN node of claim 1, in which the CAN message includes event order information for identifying stale attempts to update the global variable.

4. The CAN node of claim 1 included in a lightbar.

5. The CAN node of claim 1 included in a siren.

6. The CAN node of claim 1, in which the device status is the input status.

7. The CAN node of claim 6, in which the input status corresponds to a voltage level on a wire input of the CAN node.

8. The CAN node of claim 1, in which the device status is the output status.

9. The CAN node of claim 8, in which the output status corresponds to an illumination state of a light head of the CAN node.

10. The CAN node of claim 1, in which the processor circuitry is configured to periodically broadcast messages for synchronizing the global variable among the other members of the set of communicatively coupled CAN nodes.

11. The CAN node of claim 1, in which the behavioral equation includes as an operand a local variable that controls the device status.

12. A method, performed by a configuration workstation including a graphical user interface, of controlling behavior of controller area network (CAN) nodes for an auxiliary network over a first CAN bus, the CAN nodes configured to act as a vehicle-carried warning system when deployed in an automobile, the automobile having a second CAN bus for its OEM network that is independent from the auxiliary network, the vehicle-carried warning system including an output device and an input device, the output device configured to change an output status representing a state of a light or a siren for the vehicle-carried warning system, the input device configured to change an input status in response to a state of a user or an automobile input, the method comprising:

presenting to a user a configuration menu representing the input status and a list of actions that the CAN nodes are capable of performing; and in response to the user selecting one of the actions from the list and dragging it to the configuration menu, generating a behavioral equation mapping a global variable associated with the input status to the selected action associated with the output status, the global variable acting as a shared data structure maintained by the CAN nodes, such that a set of global variables represents input statuses and output statuses for the vehicle-carried warning system.

13. The method of claim 12, further comprising compiling bytecode representing the behavioral equations.

14. The method of claim 13, further comprising providing the bytecode through a CAN bus connection.

15. The method of claim 12, in which the behavioral equation defines dimming operations for lighting devices.

16. The method of claim 12, in which the behavioral equation defines a state of siren in response to the input status.

17. The method of claim 12, in which the behavioral equation defines a state of lightbar in response to the input status.

18. At least one non-transitory computer readable storage medium, having instructions stored thereon, that when executed on a device, configure the device to perform the method of claim 12.

19. The method of claim 12, further comprising updating the configuration menu to reflect real-time configuration changes.

20. The method of claim 12, in which the configuration workstation is a portable device configured to connect to the CAN nodes in the automobile.

21. The method of claim 12, further comprising mapping the input status to multiple actions to be executed simultaneously.

22. The method of claim 12, further comprising providing the capability to export configuration settings to a file format that can be imported.

23. The method of claim 12, in which the configuration workstation includes a touch screen interface to facilitate the drag-and-drop functionality for the user.

* * * * *